(12) United States Patent
Wu et al.

(10) Patent No.: US 11,804,935 B2
(45) Date of Patent: Oct. 31, 2023

(54) CHANNEL ACCESS TECHNIQUES FOR POSITIONING REFERENCE SIGNAL TRANSMISSION

(71) Applicant: QUALCOMM Incorporated, San Diego, CA (US)

(72) Inventors: Shuanshuan Wu, San Diego, CA (US); Yisheng Xue, San Diego, CA (US); Arthur Gubeskys, San Diego, CA (US); Jing Sun, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 17/383,745

(22) Filed: Jul. 23, 2021

(65) Prior Publication Data

US 2023/0022666 A1 Jan. 26, 2023

(51) Int. Cl.
*H04L 5/00* (2006.01)
*H04W 64/00* (2009.01)

(52) U.S. Cl.
CPC ............ *H04L 5/005* (2013.01); *H04W 64/00* (2013.01)

(58) Field of Classification Search
CPC ...... H04L 5/005; H04L 5/0048; H04W 64/00; G01S 1/00; G01S 3/00; G01S 5/00
See application file for complete search history.

(56) References Cited

U.S. PATENT DOCUMENTS

| | | | |
|---|---|---|---|
| 2021/0058891 A1* | 2/2021 | Huang | H04W 24/10 |
| 2021/0076225 A1* | 3/2021 | Kim | H04L 5/005 |
| 2021/0083830 A1* | 3/2021 | Yerramalli | H04W 64/00 |
| 2022/0229146 A1 | 7/2022 | Ko et al. | |

FOREIGN PATENT DOCUMENTS

| | | |
|---|---|---|
| WO | WO-2020251318 A1 | 12/2020 |
| WO | WO-2021112610 A1 | 6/2021 |
| WO | WO-2022034485 A1 * | 2/2022 |
| WO | WO-2022195423 A1 * | 9/2022 |

OTHER PUBLICATIONS

International Search Report and Written Opinion—PCT/US2022/037817—ISA/EPO—dated Oct. 24, 2022.

* cited by examiner

*Primary Examiner* — Ian N Moore
*Assistant Examiner* — Latresa A McCallum
(74) *Attorney, Agent, or Firm* — QUALCOMM Incorporated

(57) ABSTRACT

Methods, systems, and devices for wireless communications are described. A first user equipment (UE) may belong to a group of UEs that includes at least a second UE and a third UE. The first UE may perform a channel access procedure and, when the channel access procedure is successful, may transmit a first positioning reference signal (PRS) over a sidelink communication link to the second and third UEs. The first UE may transmit the first PRS during a first time interval of a transmission window. Based on receiving the first PRS, the second UE may perform a channel access procedure and may transmit a second PRS to the first UE during a second time interval of the transmission window. The second PRS may be multiplexed (e.g., using frequency division multiplexing (FDM) or code division multiplexing (CDM)) with at least a third PRS transmitted by the third UE.

30 Claims, 13 Drawing Sheets

CHANNEL ACCESS TECHNIQUES FOR POSITIONING REFERENCE SIGNAL TRANSMISSION

FIELD OF TECHNOLOGY

The following relates to wireless communications, including channel access techniques for positioning reference signal (PRS) transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

UEs in some wireless communications systems may use positioning procedures to determine an absolute or relative position of other devices (e.g., other UEs) in the system. For example, a first UE may use positioning to determine locations of one or more other UEs, roadside units (RSUs), pedestrians, or the like. The UEs may perform positioning by exchanging and measuring positioning reference signals (PRSs), for example, over a sidelink communication link.

SUMMARY

The described techniques relate to improved methods, systems, devices, and apparatuses that support channel access techniques for positioning reference signal (PRS) transmission. Generally, the described techniques provide for efficient communication of PRSs via sidelink communications between a group of UEs. For example, the group of UEs may exchange PRSs over an unlicensed shared spectrum (e.g., with contention-based access), which may provide relatively increased bandwidth and improved accuracy in positioning procedures. In such cases, a first UE may be designated an initiator UE and may form a group with one or more other UEs (e.g., responder UEs) to share a channel occupancy time (COT). The initiator UE may perform a channel access procedure (e.g., a listen-before-talk (LBT) procedure) to determine if a channel is available. When the channel is available, the initiator UE may transmit a PRS via sidelink to the responder UEs during a first time interval of a transmission window. The responder UEs may monitor the sidelink channel and, upon receiving the PRS from the initiator UE, may transmit respective PRSs during a second time interval of the transmission window (e.g., after performing respective channel access procedures during the shared COT). The PRSs transmitted by the responder UEs may be multiplexed with one another, for instance, using frequency division multiplexing (FDM) or code division multiplexing (CDM).

A method for wireless communications at a first user equipment (UE) is described. The method may include performing a channel access procedure for transmitting one or more PRSs to a group of UEs during a transmission window, where the group of UEs includes at least the first UE, a second UE, and a third UE, transmitting, over a sidelink communication link during a first interval of the transmission window, a first PRS to at least the second UE and the third UE based on the channel access procedure being successful, and receiving, over the sidelink communication link during a second time interval of the transmission window, a second PRS associated with the second UE and a third PRS associated with the third UE, where the second PRS is multiplexed with the third PRS within the second time interval.

An apparatus for wireless communications at a first UE is described. The apparatus may include a processor, memory coupled with the processor, and instructions stored in the memory. The instructions may be executable by the processor to cause the apparatus to perform a channel access procedure for transmitting one or more PRSs to a group of UEs during a transmission window, where the group of UEs includes at least the first UE, a second UE, and a third UE, transmit, over a sidelink communication link during a first interval of the transmission window, a first PRS to at least the second UE and the third UE based on the channel access procedure being successful, and receive, over the sidelink communication link during a second time interval of the transmission window, a second PRS associated with the second UE and a third PRS associated with the third UE, where the second PRS is multiplexed with the third PRS within the second time interval.

Another apparatus for wireless communications at a first UE is described. The apparatus may include means for performing a channel access procedure for transmitting one or more PRSs to a group of UEs during a transmission window, where the group of UEs includes at least the first UE, a second UE, and a third UE, means for transmitting, over a sidelink communication link during a first interval of the transmission window, a first PRS to at least the second UE and the third UE based on the channel access procedure being successful, and means for receiving, over the sidelink communication link during a second time interval of the transmission window, a second PRS associated with the second UE and a third PRS associated with the third UE, where the second PRS is multiplexed with the third PRS within the second time interval.

A non-transitory computer-readable medium storing code for wireless communications at a first UE is described. The code may include instructions executable by a processor to perform a channel access procedure for transmitting one or more PRSs to a group of UEs during a transmission window, where the group of UEs includes at least the first UE, a second UE, and a third UE, transmit, over a sidelink communication link during a first interval of the transmission window, a first PRS to at least the second UE and the third UE based on the channel access procedure being successful, and receive, over the sidelink communication link during a second time interval of the transmission window, a second PRS associated with the second UE and a third PRS associated with the third UE, where the second PRS is multiplexed with the third PRS within the second time interval.

In some examples of the method, apparatuses, and non-transitory computer-readable medium described herein, transmitting the first PRS may include operations, features, means, or instructions for transmitting the first PRS in accordance with a PRS pattern, the PRS pattern being based on a value corresponding to a quantity of resource elements within the first time interval.

In some examples of the method, apparatuses, and non-transitory computer-readable medium described herein, transmitting the first PRS may include operations, features, means, or instructions for transmitting one or more repetitions of the first PRS in one or more symbol periods of the first time interval, where the first PRS may be transmitted in accordance with a first PRS pattern and the one or more repetitions of the first PRS may be transmitted in accordance with a second PRS pattern different from the first PRS pattern.

Some examples of the method, apparatuses, and non-transitory computer-readable medium described herein may further include operations, features, means, or instructions for determining one or more PRS parameters based on the group of UEs, where transmitting the first PRS and receiving the second PRS and the third PRS may be based on the one or more PRS parameters.

Some examples of the method, apparatuses, and non-transitory computer-readable medium described herein may further include operations, features, means, or instructions for transmitting, to the group of UEs, a message indicating the one or more PRS parameters.

In some examples of the method, apparatuses, and non-transitory computer-readable medium described herein, the message indicating the one or more PRS parameters includes a group configuration message.

In some examples of the method, apparatuses, and non-transitory computer-readable medium described herein, the one or more PRS parameters include a configuration of the transmission window, a duration of a gap duration between the first time interval and the second time interval, a channel access procedure type for the second UE, a channel access procedure type for the third UE, a resource allocation for the second PRS, a resource allocation for the third PRS, one or more PRS patterns, one or more power control parameters, or any combination thereof.

In some examples of the method, apparatuses, and non-transitory computer-readable medium described herein, the one or more PRS patterns may be based on a quantity of UEs in the group, an orthogonal cover code, a cyclic shift, a comb, or any combination thereof.

Some examples of the method, apparatuses, and non-transitory computer-readable medium described herein may further include operations, features, means, or instructions for measuring a signal quality of one or more signals received from at least one UE of the group of UEs, determining a group configuration for the group of UEs based on the measured signal quality, and transmitting, to the group of UEs, a group configuration message indicating the group configuration.

Some examples of the method, apparatuses, and non-transitory computer-readable medium described herein may further include operations, features, means, or instructions for measuring a signal quality of a signal from the second UE, determining a transmission power for the second PRS based on the signal quality, and transmitting an indication of the transmission power to the second UE.

In some examples of the method, apparatuses, and non-transitory computer-readable medium described herein, the second PRS may be multiplexed with the third PRS within the second time interval using FDM, CDM, or any combination thereof.

In some examples of the method, apparatuses, and non-transitory computer-readable medium described herein, the first time interval may be before the second time interval, the first time interval and the second time interval being separated by a gap duration that satisfies a threshold value.

A method for wireless communications at a first UE is described. The method may include monitoring a sidelink channel for a first PRS from a second UE, where the first UE and the second UE belong to a same group of UEs, performing a channel access procedure based on receiving the first PRS during a first interval of a transmission window, where the channel access procedure is performed prior to a second time interval of the transmission window, and transmitting, during the second time interval and based on the channel access procedure being successful, a second PRS to the second UE, where the second PRS is multiplexed with one or more other PRS transmissions from one or more other UEs within the second time interval.

An apparatus for wireless communications at a first UE is described. The apparatus may include a processor, memory coupled with the processor, and instructions stored in the memory. The instructions may be executable by the processor to cause the apparatus to monitor a sidelink channel for a first PRS from a second UE, where the first UE and the second UE belong to a same group of UEs, perform a channel access procedure based on receiving the first PRS during a first interval of a transmission window, where the channel access procedure is performed prior to a second time interval of the transmission window, and transmit, during the second time interval and based on the channel access procedure being successful, a second PRS to the second UE, where the second PRS is multiplexed with one or more other PRS transmissions from one or more other UEs within the second time interval.

Another apparatus for wireless communications at a first UE is described. The apparatus may include means for monitoring a sidelink channel for a first PRS from a second UE, where the first UE and the second UE belong to a same group of UEs, means for performing a channel access procedure based on receiving the first PRS during a first interval of a transmission window, where the channel access procedure is performed prior to a second time interval of the transmission window, and means for transmitting, during the second time interval and based on the channel access procedure being successful, a second PRS to the second UE, where the second PRS is multiplexed with one or more other PRS transmissions from one or more other UEs within the second time interval.

A non-transitory computer-readable medium storing code for wireless communications at a first UE is described. The code may include instructions executable by a processor to monitor a sidelink channel for a first PRS from a second UE, where the first UE and the second UE belong to a same group of UEs, perform a channel access procedure based on receiving the first PRS during a first interval of a transmission window, where the channel access procedure is performed prior to a second time interval of the transmission window, and transmit, during the second time interval and based on the channel access procedure being successful, a second PRS to the second UE, where the second PRS is multiplexed with one or more other PRS transmissions from one or more other UEs within the second time interval.

Some examples of the method, apparatuses, and non-transitory computer-readable medium described herein may further include operations, features, means, or instructions for receiving, from the second UE, a message indicating one or more PRS parameters, where receiving the first PRS and transmitting the second PRS may be based on the one or more PRS parameters.

In some examples of the method, apparatuses, and non-transitory computer-readable medium described herein, the one or more PRS parameters include a configuration of the time window, a gap duration, a channel access procedure type for the first UE, a resource allocation for the second PRS, one or more PRS patterns, one or more power control parameters, or any combination thereof.

In some examples of the method, apparatuses, and non-transitory computer-readable medium described herein, the first PRS may be received in accordance with one of the one or more PRS patterns, the one of the one or more PRS patterns being based on a value corresponding to a quantity of resource elements within the first time interval.

In some examples of the method, apparatuses, and non-transitory computer-readable medium described herein, receiving the first PRS may include operations, features, means, or instructions for receiving one or more repetitions of the first PRS in one or more symbol periods of the first time interval, where the first PRS may be received in accordance with a first PRS pattern and the one or more repetitions of the first PRS may be received in accordance with a second PRS pattern different from the first PRS pattern.

In some examples of the method, apparatuses, and non-transitory computer-readable medium described herein, the one or more PRS patterns may be based on a quantity of UEs in the group, an orthogonal cover code, a cyclic shift, a comb, or any combination thereof.

In some examples of the method, apparatuses, and non-transitory computer-readable medium described herein, the message indicating the one or more PRS parameters includes a group configuration message.

Some examples of the method, apparatuses, and non-transitory computer-readable medium described herein may further include operations, features, means, or instructions for receiving, from the second UE, an indication of a transmission power, where the second PRS may be transmitted based on the transmission power.

Some examples of the method, apparatuses, and non-transitory computer-readable medium described herein may further include operations, features, means, or instructions for receiving, from the second UE, a group configuration message indicating a grouping including at least the first UE and the second UE.

Some examples of the method, apparatuses, and non-transitory computer-readable medium described herein may further include operations, features, means, or instructions for receiving, from the second UE, an indication of a type of channel access procedure, where the channel access procedure may be performed based on the indication.

In some examples of the method, apparatuses, and non-transitory computer-readable medium described herein, performing the channel access procedure may include operations, features, means, or instructions for determining a type of channel access procedure, where the type of channel access procedure may be preconfigured.

In some examples of the method, apparatuses, and non-transitory computer-readable medium described herein, the second PRS may be multiplexed with the one or more other PRSs using FDM, CDM, or any combination thereof.

In some examples of the method, apparatuses, and non-transitory computer-readable medium described herein, the first time interval may be before the second time interval, the first time interval and the second time interval being separated by a gap duration that satisfies a threshold value.

Some examples of the method, apparatuses, and non-transitory computer-readable medium described herein may further include operations, features, means, or instructions for determining the gap duration based on receiving the first PRS, where the gap duration may be preconfigured or based on the channel access procedure.

DETAILED DESCRIPTION

Figure 1:
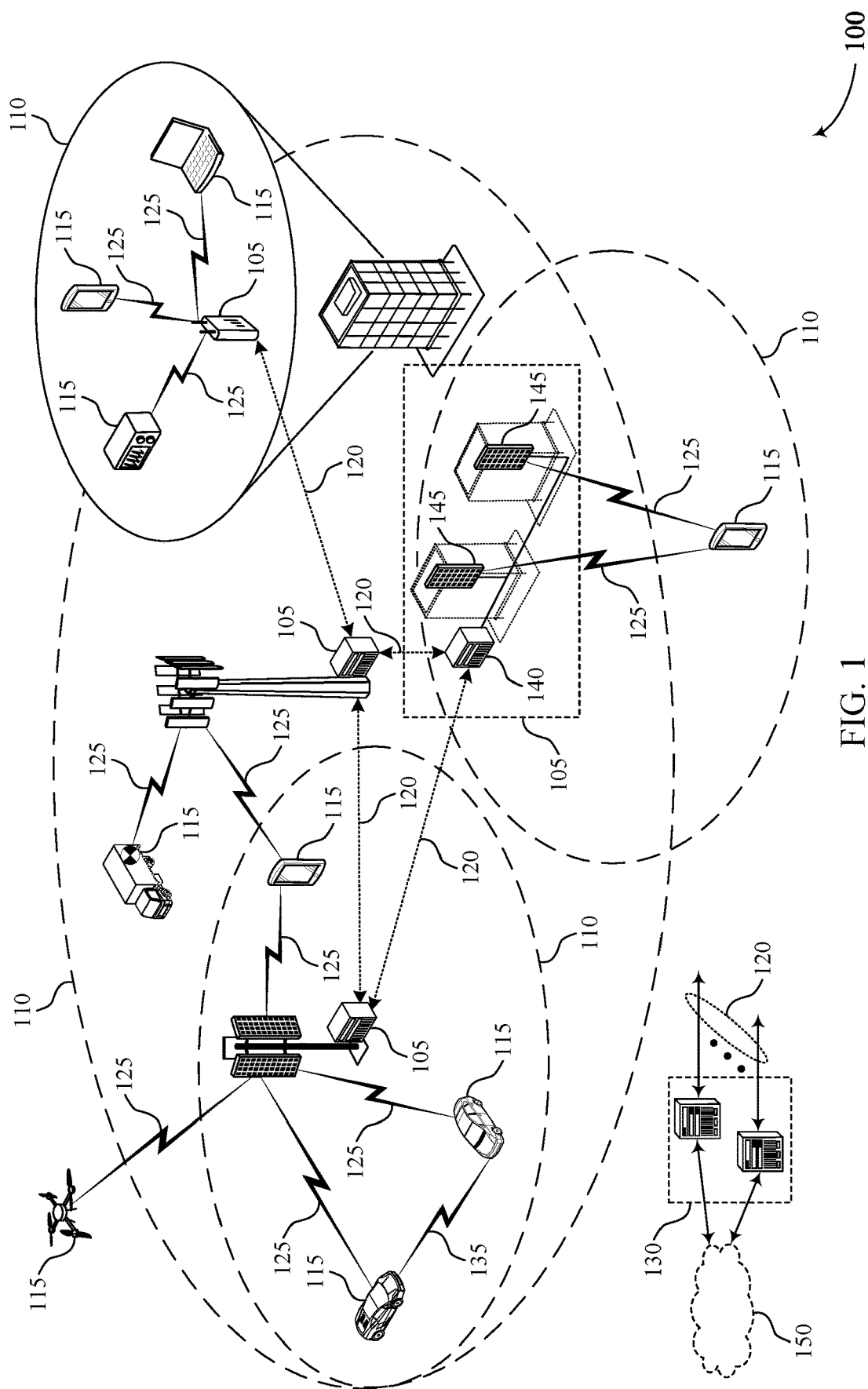
FIG. 1 illustrates an example of a wireless communications system that supports channel access techniques for positioning reference signal (PRS) transmission in accordance with aspects of the present disclosure.

Some wireless communication systems, such as fifth generation (5G) New Radio (NR) systems, support wireless devices establishing both an access link (e.g., a Uu interface) and a sidelink (e.g., a PC5 interface). For example, a user equipment (UE) may establish an access link with a base station and a sidelink (e.g., a sidelink communication link) with another UE. In some cases, a UE may establish an access link with a base station and may establish a sidelink with another UE which operates as a relay (e.g., which has an access link with the same or different base station as the UE) such that the UE may communicate with a network via either the access link, or the sidelink, or both. In some cases, devices may use a sidelink to extend a coverage area. For example, a UE may establish a sidelink with another UE (e.g., a relay UE) having an access link with a base station for which the UE is out of coverage. Sidelink communications may be referred to as vehicle-to-vehicle (V2V) communications, vehicle-to-everything (V2X) communications, device-to-device (D2D) communications, or other terminology. In some examples, the UE may allocate resources for sidelink communications via a resource grant from a base station or autonomously allocate resources for sidelink communications using a sidelink sensing procedure.

A UE operating in a sidelink communications system may determine an absolute or relative position of one or more other devices in a system. This may be a relative position or distance of the UE with respect to another UE, or an absolute position when the absolute position of a reference UE is known. As an example, a UE (e.g., a vehicle UE) may use positioning to determine a location of another UE (e.g., another vehicle UE), a pedestrian, a roadside unit (RSU), or the like. The UE may perform a positioning procedure by measuring a received positioning reference signal (PRS) and, in some cases, may also transmit a PRS to other UEs. In some examples, however, positioning procedures (e.g., between vehicles) may require a relatively high level of accuracy, which may in turn depend on a size of a bandwidth in which the PRS is transmitted. Additionally, positioning procedures may be time-sensitive, particularly if one or more UEs are moving. For instance, a vehicle UE that is in motion may rely on relatively high accuracy and low latency when performing a positioning procedure to determine a location of a pedestrian.

Relatively wider bandwidths may be available in an unlicensed shared spectrum (e.g., as compared to an intelligent transportation system (ITS) radio frequency spectrum spectrum), which may increase accuracy in positioning procedures. Before transmitting over a shared spectrum, a UE may perform a channel access procedure (e.g., a listen-before-talk (LBT) procedure) in which the UE determines whether the channel is available to use for transmission, for instance, by sensing energy present on the channel. If the energy is below a threshold, the UE may access the channel and transmit a PRS. If the channel is not clear (e.g., the energy is above a threshold), however, the UE may follow a back-off procedure and may wait some duration of time before attempting to sense the channel again. Thus, although the unlicensed shared spectrum may provide wider bandwidths, and therefore increased accuracy for positioning procedures, a UE may not be able to consistently or reliably transmit PRS in a time-sensitive manner if the channel access procedure is not successful.

In some examples, a group of UEs may share a channel occupancy of an unlicensed spectrum according to channel occupancy time (COT) sharing techniques. For instance, a first UE (which may be referred to as an initiator UE) of the group of UEs may perform an LBT procedure (e.g., a category (CAT) 4 LBT) and, if successful, may transmit in the unlicensed spectrum to initiate a channel occupancy (e.g., a COT). The first UE may share the COT with the other UEs (which may be referred to as responder UEs), such that the initiator UE and the responder UEs may transmit and receive PRSs within the same channel occupancy. While COT sharing may reduce some latency associated with performing LBTs, the responder UEs may still perform respective LBTs (e.g., CAT2 LBTs) before transmitting respective PRSs, for instance, according to a transmission order. As such, the positioning procedure may be negatively impacted by the increased time associated with the transmission order, and may a relatively high likelihood of being interrupted (e.g., if a responder UE fails an LBT).

The techniques described herein may enable a group of sidelink UEs to avoid delays associated with channel access procedures and COT sharing and may increase the probability that a channel access procedure is successful. A first UE may be designated the initiator UE and may form a group with two or more responder UEs. The first UE may determine or otherwise identify a transmission window during which the first UE may perform a channel access procedure (e.g., a CAT4 LBT) to determine if the shared channel is available. When the LBT is successful, the first UE may transmit a first PRS to the responder UEs during a first interval of the transmission window. Based on receiving the first PRS, the responder UEs may perform respective channel access procedures (e.g., CAT1 or CAT2 LBTs) prior to a second interval of the transmission window; if the channel access procedure is successful, each responder UE may transmit a respective PRS to the first UE during the second interval, where the responder PRSs are multiplexed (e.g., using frequency division multiplexing (FDM), code division multiplexing (CDM), or some combination thereof). That is, the responder UEs may perform channel access procedures and transmit PRSs simultaneously (e.g., via multiplexing in a same time resource), rather than consecutively (e.g., as dictated by a transmission order), which may considerably reduce the duration of the PRS exchange. Transmitting PRSs using multiplexing may ensure that the PRSs are transmitted on orthogonal resources, thereby reducing the likelihood of interference among the responder UEs. Additionally, the multiplexing of PRS in the first and second time intervals ensures that there may be, for example, only one transmission gap in the shared COT, which may enable a simplified channel access procedure for responder UEs (e.g., responder UEs may perform channel access without energy sensing, such as with CAT1 LBT). By enabling all responder UEs in the group to transmit within a short time period after the initiator UE performs the channel access procedure, transmission of the PRSs from the responder UEs may have a higher likelihood of success.

In some examples, in addition to transmitting a PRS, the initiator UE may transmit an indication of one or more PRS parameters to the responder UEs. In some cases, the PRS parameters may include a duration for responder UEs to wait (e.g., a gap duration) before transmitting a respective PRS, a type of channel access procedure for the responder UEs to perform, a transmission pattern or resource allocation information for transmission of the PRSs, or some combination thereof, among other examples. In some examples, the PRS parameters may be determined or indicated by the initiator UE as part of a group configuration (e.g., during formation of the group of UEs), while in other examples, the PRS parameters may be preconfigured or predetermined.

Particular aspects of the subject matter described herein may be implemented to realize one or more advantages. The described techniques may support improvements in positioning and related procedures performed by UEs. For example, by multiplexing PRSs from multiple UEs (e.g., vehicles operating in a cellular V2X (CV2X) system), a UE may determine absolute or relative positions of the other UEs with increased reliability. More specifically, by reducing a number of channel access procedures performed by multiple UEs, PRSs transmitted during a shared time window may be sent to an initiator UE with increased reliability and reduced latency. In addition, multiplexing PRS in accordance with the described techniques may avoids the sequential PRS transmission from multiple responder UEs, and thus also avoid some channel access procedures (e.g., a CAT 2 LBT) in COT sharing, and channel access probability can be enhanced. The improved efficiency achieved by transmitting PRSs according to the described techniques may enable robust positioning procedures by a UE, resulting in improved safety for procedures performed by the UE that rely on positions of other UEs, pedestrians, other vehicles, or the like. Thus, the supported techniques may include improved UE operations, and, in some examples, may promote efficiencies in communications, among other benefits.

Aspects of the disclosure are initially described in the context of wireless communications systems. Aspects of the disclosure are then explained with reference to transmission diagrams and a process flow. Aspects of the disclosure are further illustrated by and described with reference to apparatus diagrams, system diagrams, and flowcharts that relate to channel access techniques for PRS transmission.

FIG. 1 illustrates an example of a wireless communications system 100 that supports channel access techniques for PRS transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the wireless communications system 100 may support sidelink communications between two or more UEs 115. For example, in a V2X communications system, a first UE 115 may communicate with a second UE 115 using a sidelink connection (e.g., a sidelink channel). The sidelink connection may be associated with a radio frequency spectrum band, such as a cellular radio frequency spectrum band (e.g., a sidelink channel sharing spectrum in a licensed cellular radio frequency spectrum band) or a dedicated intelligent transportation system (ITS) radio frequency spectrum band. In such systems, a UE 115 may contend for access to the shared spectrum to transmit sidelink data to another UE 115. For instance, the first UE 115 may perform a channel access procedure, such as a listen-before-talk (LBT) procedure, to gain access to the shared radio frequency spectrum for a sidelink transmission to the second UE 115.

In some cases, the first UE 115 and the second UE 115 may use the sidelink connection to perform a sidelink positioning procedure (e.g., for V2X, public safety, or commercial use cases). The sidelink positioning procedure may enable the first UE 115 and the second UE 115 to obtain positioning information based on measuring one or more sidelink PRSs. For example, the first UE 115 may transmit a sidelink positioning reference signal (PRS) and the second UE 115 may perform a set of measurements based on detecting the sidelink PRS. The set of measurements may include a time of arrival (ToA), a time delay of arrival (TDoA), an angle of arrival (AoA), a round trip time (RTT), or a combination thereof. The second UE 115 may determine positioning information for the first UE 115 (and vice versa) based on the set of measurements.

Accuracy of the positioning information may depend on a bandwidth associated with the sidelink PRS. For example, a larger bandwidth may correspond to a higher accuracy. As a result, some high-accuracy sidelink positioning applications (e.g., V2X applications) may use a relatively large sidelink PRS bandwidth (e.g., 100 MHz or higher) to obtain more accurate positioning information (e.g., sub-meter level). However, some radio frequency spectrum bands (e.g., licensed radio frequency spectrum bands or ITS radio frequency spectrum bands) may not support such large PRS bandwidths.

In some cases, to reduce usage of limited bandwidth availability in licensed radio frequency spectrum bands, the first UE 115 and the second UE 115 may transmit sidelink PRSs in an unlicensed radio frequency spectrum band (e.g., an Unlicensed National Information Infrastructure (U-NII) 3 or U-NII 5 radio frequency spectrum band), which may have relatively large bandwidths available. However, the unlicensed radio frequency spectrum band may be shared with other technologies (e.g., wireless local area network (WLAN) systems, such as Wi-Fi). Additionally, access to the unlicensed radio frequency spectrum band may be regulated. For example, devices operating in the unlicensed radio frequency spectrum band may perform channel access (e.g., a channel access procedure, such as an LBT) prior to transmitting in the unlicensed radio frequency spectrum band.

When performing an LBT, a device (e.g., the first UE 115) may measure an energy level of the unlicensed radio frequency spectrum band and may transmit if the measured energy level is below a threshold. In some cases, different devices operating in the unlicensed radio frequency spectrum band may perform different types of LBTs. For example, some devices may perform a category one (CAT 1) LBT, which may include performing an LBT without energy sensing. That is, a CAT 1 LBT device may transmit without sensing energy on the channel (e.g., similar to a Type 2c channel access procedure in unlicensed radio frequency spectrum bands). Other devices may perform a category two (CAT 2) LBT, which may include performing energy sensing and comparing it against an energy threshold but without a random back-off. That is, a CAT 2 LBT device may transmit if the measured energy level is below a threshold during a time period (e.g., similar to a Type 2a or Type 2b channel access procedure). Other devices may perform a category four (CAT 4) LBT, which may include performing an LBT with a random back-off and a contention window of a variable size. That is, a CAT 4 LBT device may transmit if the measured energy level is below a threshold during the contention window (e.g., similar to a Type 1 channel access procedure). CAT 1 LBTs and CAT 2 LBTs may not be supported in some scenarios.

In some cases, to reduce variability associated with transmitting sidelink PRSs in the unlicensed radio frequency spectrum band, the first UE 115 and the second UE 115 (e.g., and any number of additional UEs 115) may form a group to exchange PRSs in a COT sharing manner (e.g., for shared channel access). Forming a group for PRS transmissions may improve the likelihood of the second UE 115 successfully accessing a shared channel in the unlicensed radio frequency spectrum band. For example, the first UE 115 may perform a channel access procedure (e.g., an LBT) in accordance with an LBT type (e.g., a CAT 4 LBT or a Type 1 channel access procedure). If the LBT is successful, the first UE 115 may initiate a COT in the unlicensed radio frequency spectrum band (e.g., based on transmitting an initiator PRS). Sharing the COT with the second UE 115 may enable the second UE 115 to transmit a PRS based on performing a CAT 1 LBT or a CAT 2 LBT (e.g., an LBT without a random back-off) rather than a CAT 4 LBT (e.g., an LBT with a random back-off). For example, in response to detecting the initiator PRS (e.g., during the COT initiated by first UE 115), the second UE 115 may transmit a responder PRS based on performing a CAT 1 LBT or a CAT 2 LBT. As a result, the second UE 115 may transmit the PRS with reduced latency and improved reliability, which may in turn enable increased accuracy in associated sidelink positioning procedures.

A UE 115 (e.g., or any other device in the wireless communications system 100) initiating a COT in an unlicensed radio frequency spectrum band may be referred to as an initiator UE 115, and a PRS transmitted by an initiator UE 115 may be referred to as an initiator PRS. A UE 115 sharing the COT of the initiator may be referred to as a responder UE 115, and a PRS transmitted by a responder UE 115 may be referred to as a responder PRS. In some sidelink positioning procedures, there may be one initiator and one or more responders. For example, in some cases, such as in V2X systems, multiple UEs 115 in a group may perform a group sidelink positioning procedure based on exchanging PRSs (e.g., during a shared COT). For instance, a roadside unit (RSU) may be an example of an initiator and may exchange PRSs with multiple UEs 115 (e.g., the first UE 115 and the second UE 115). In such cases, the RSU may transmit an initiator PRS and each of the multiple UEs 115 may transmit a responder PRS to the RSU (e.g., based on detecting the initiator PRS) in accordance with a transmission order. For example, if the RSU transmits the initiator PRS, the first UE 115 may transmit a first responder PRS to the RSU based on detecting the initiator PRS and the second UE 115 may transmit a second responder PRS to the RSU based on detecting the initiator PRS from the RSU or the first responder PRS from the first UE 115.

However, in some examples, waiting for the multiple responder UEs 115 to transmit responder PRSs in the transmission order may increase latency and reduce accuracy of the sidelink positioning procedure. For example, before transmitting a responder PRS, each of the responder UEs 115 may perform an LBT. In particular, if a COT is shared by multiple UEs 115 (e.g., N devices, where N>2) and transmissions from the N devices are time division multiplexed, there may be N−1 gaps between the N transmissions. In this case, each responder UE 115 may perform at least a CAT 2 LBT prior to its transmission (where CAT 2 LBT may include energy sensing procedures in a fixed time duration) Here, it may be possible that an LBT procedure fails due to sensed energy satisfying a threshold.

Thus, as the number of responder UEs 115 increases, the time elapsed for each responder UE 115 to perform an LBT and transmit a responder PRS according to the transmission order may increase. That is, even if the LBT is a CAT1 or a CAT2 LBT (e.g., instead of a CAT4 LBT with a random backoff), each responder UE 115 may wait for the other responder UEs 115 to transmit a responder PRS before accessing the channel; this may reduce the likelihood that a responder UE 115 successfully accesses the channel. Additionally, in some cases, a transmission opportunity (e.g., a time resource location) for an initiator PRS may be variable.

That is, transmission of an initiator PRS may be dependent upon a successful LBT; if the LBT procedure is unsuccessful, an initiator UE 115 may be unable to transmit a PRS and may have to re-attempt the LBT procedure. Further, based on the variability of the initiator PRS transmission opportunity, the responder UEs 115 may be unable to determine (e.g., predict) when the initiator PRS may arrive. In some examples, if one or more of the UEs 115 (e.g., an initiator UE 115 and/or any responder UEs 115) are moving, the accuracy of the sidelink positioning procedure may decrease as the time elapsed between responder PRS transmissions increases.

To reduce latency in sidelink positioning procedures and increase the likelihood of successful channel access procedures, wireless communications system 100 may support UEs 115 exchanging PRSs according to the techniques described herein. A first UE 115 (e.g., an initiator UE 115) may belong to a group with a second UE 115 and a third UE 115, where the second UE 115 and the third UE 115 are responder UEs 115. The first UE 115 may determine a transmission window during which the first UE 115 may perform a channel access procedure (e.g., an LBT, such as a CAT4 LBT) and transmit (e.g., based on the LBT being successful) an initiator PRS to the second UE 115 and the third UE 115. The second UE 115 and the third UE 115 may transmit, to the first UE 115, respective responder PRSs during the transmission window, for instance, based on receiving the initiator PRS. The respective responder PRSs may be multiplexed, for example, using FDM, CDM, or some combination thereof. In such cases, a COT may be shared, for example, by N>2 devices, and the devices may transmit in two transmission occasions, one transmission occasion for the initiator PRS and the other transmission occasion one for all responder PRS(s). As such, there may be a single gap in the shared COT, and LBT may be exempted for responder UEs 115 (e.g., they may perform a CAT1 LBT, which may exclude energy sensing procedures).

The transmission window may be divided into multiple time intervals for transmitting the initiator PRS and the responder PRS(s) such that the initiator PRS and the responder PRSs may be multiplexed in the time domain (e.g., using TDM such that the second and third UEs 115 transmit respective responder PRSs after the first UE 115 transmits the initiator PRS). For example, the first UE 115 may perform the channel access procedure and transmit the initiator PRS during a first time interval of the transmission window. The second UE 115 and the third UE 115 may transmit multiplexed respective responder PRSs during a second interval of the transmission window. Multiplexing the initiator PRS and the responder PRSs in the time domain, while additionally multiplexing the responder PRSs with one another, may enable the UEs 115 to avoid latency and delays associated with transmitting PRSs according to a transmission order.

In some examples, the first time interval and the second time interval may be separated by a gap. The second UE 115 and the third UE 115 may perform respective channel access procedures during the gap. That is, the second UE 115 and the third UE 115 may perform channel access procedures simultaneously during the gap, instead of one after another (e.g., based on a transmission order). In some examples, if a gap between the initiator PRS and the responder PRS is less than a threshold (e.g., 25 microseconds (μs)), the second UE 115 and the third UE 115 may each perform a CAT 1 LBT or a CAT 2 LBT. That is, the second UE 115 and the third UE 115 may refrain from performing a CAT 4 LBT (e.g., with a random back-off) prior to transmitting the responder PRSs, thereby enabling the second UE 115 and the third UE 115 to avoid delays associated with performing a random back-off and improving the likelihood of successfully accessing the channel.

Figure 2:
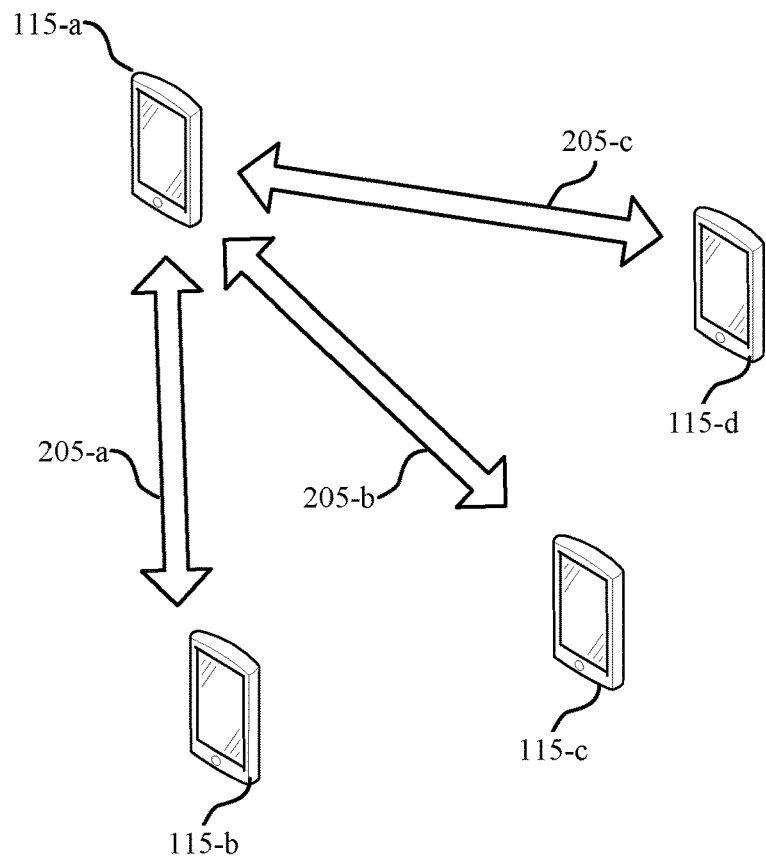
FIG. 2 illustrates an example of a wireless communications system that supports channel access techniques for PRS transmission in accordance with aspects of the present disclosure.
Figure 2:
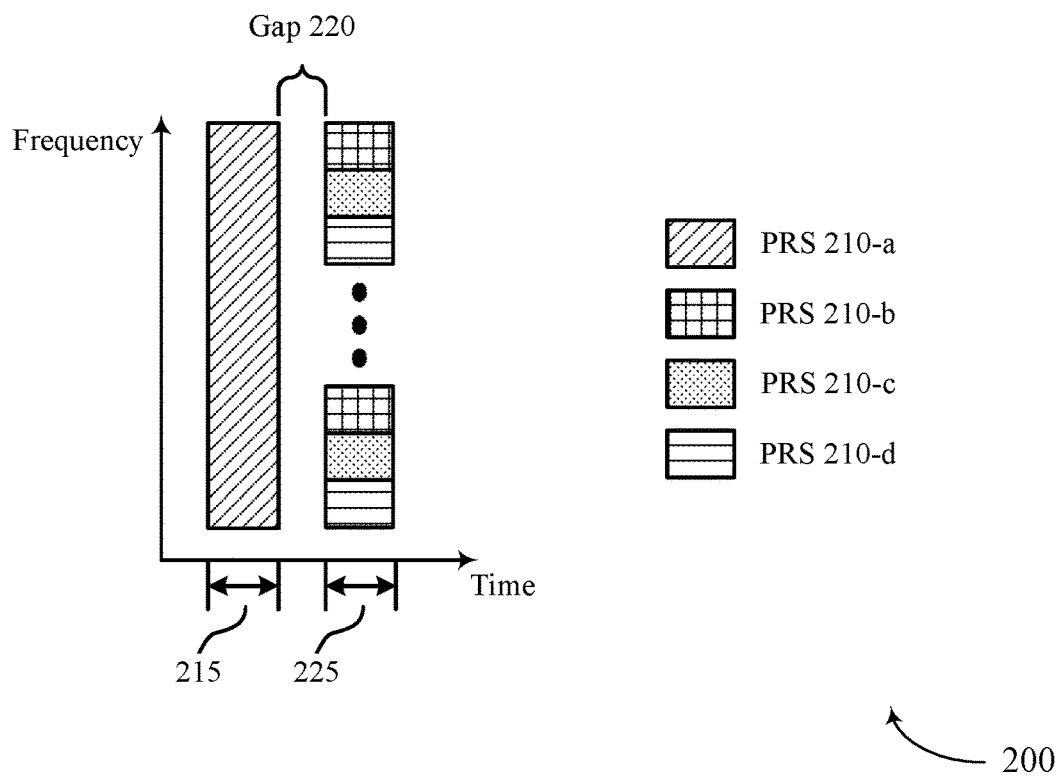

FIG. 2 illustrates an example of a wireless communications system 200 that supports channel access techniques for PRS transmission in accordance with aspects of the present disclosure. The wireless communications system 200 may implement or be implemented by aspects of the wireless communications system 100. For example, the wireless communications system 200 may include UEs 115-a, 115-b, 115-c, and 115-d, which may be examples of UEs 115 described with reference to FIG. 1. The UEs 115 in the wireless communications system 200 may belong to a same group of UEs and may communicate over respective sidelinks 205 (e.g., sidelink communication links).

The UEs 115 may exchange PRSs in an unlicensed (e.g., shared) radio frequency spectrum band. For example, the UE 115-a (e.g., the initiator UE) may perform a channel access procedure during a transmission window to determine if a channel is available. In some examples, the channel access procedure may be a CAT4 LBT or a Type 1 channel access procedure. Upon a successful channel access procedure, the UE 115-a may transmit an initiator PRS 210-a to the UEs 115-b, 115-c, and 115-d (e.g., the responder UEs) during a first interval 215 of the transmission window. Specifically, the UE 115-a may transmit the initiator PRS 210-a to the UE 115-b using the sidelink 205-a, to the UE 115-c using a sidelink 205-b, and to the UE 115-d using the sidelink 205-c. In some cases, the UE 115-a may transmit one or more repetitions of the initiator PRS 210-a during the first time interval 215 (e.g., during one or more symbol periods of the first time interval 215). In some examples, the initiator PRS 210-a may have a predetermined duration (e.g., one slot).

The UEs 115-b, 115-c, and 115-d may perform respective channel access procedures, for instance, in response to detecting the initiator PRS 210-a. In some cases, the channel access procedures performed by the responder UEs may be CAT1 LBTs or Type 2c channel access procedures, such that the responder UEs may access the channel without sensing. In other cases, the channel access procedures may be CAT2 LBTs or Type 2a/2b channel access procedures, where the responder UEs may perform energy sensing but may avoid random back-off times. The type of channel access procedure to be performed may be preconfigured or predetermined, or may be indicated (e.g., by the UE 115-a). In some examples, the type of channel access procedure may be preconfigured, but may be changed or overwritten by an indication received from the UE 115-a. Based on successful channel access procedures, the UEs 115-b, 115-c, and 115-d may transmit responder PRSs 210-b, 210-c, and 210-d, respectively, to the UE 115-a via the corresponding sidelinks 205.

In accordance with techniques described herein, the responder UEs may perform respective channel access procedures during a gap 220 between the first time interval 215 of the transmission window and a second time interval 225 of the transmission window. That is, in response to detecting (e.g., receiving) the initiator PRS 210-a, a responder UE (e.g., the UE 115-b, 115-c, and/or 115-d), may determine a duration of the gap 220 and may perform a channel access procedure during the gap 220. In some examples, the duration of the gap 220 may be less than a threshold or may be preconfigured or predetermined (e.g., as a default duration, such as 16 μs or 25 μs), while in other examples, the duration of the gap 220 may be indicated by the UE 115-a.

Additionally, or alternatively, the duration of the gap 220 may correspond to a type of channel access procedure performed by the responder UE. For instance, the gap 220 may have a duration of 16 μs for a Type 2c channel access procedure or a duration of 25 us for a Type 2a or Type 2b channel access procedure.

The responder UEs may transmit respective responder PRSs 210 to the initiator UE during the second time interval 225. The responder PRSs 210 may be multiplexed in the second time interval 225 such that the resources used to transmit the responder PRSs 210 are orthogonal, for instance, using FDM or CDM, as described in more detail with reference to FIGS. 3 and 4. In the example of FIG. 2, the responder PRSs 210-b, 210-c, and 210-d may be multiplexed in the frequency domain (e.g., using FDM) such that each responder PRS 210 is transmitted in a different frequency resource but a same time resource (e.g., the second time interval 225). For instance, the responder PRS 210-b may be transmitted in a first frequency resource, the responder PRS 210-c may be transmitted in a second frequency resource, and the responder PRS 210-d may be transmitted in a third frequency resource. In some cases, the second time interval 225 may be an example of a slot or one or more symbols. Multiplexing of PRS in the first time interval 215 and the second time interval 225 may result in one transmission gap 220 in a shared COT, which may enable a simplified channel access procedure for the responder UEs 115 (e.g., with minimal or no energy sensing performed prior to transmission of a responder PRS).

In some examples, the initiator PRS 210-a and/or the responder PRSs 210-b, 210-c, and 210-d may be transmitted and received in accordance with one or more PRS parameters, such as one or more PRS patterns for the PRSs 210, a resource allocation (e.g., a frequency resource location) for each PRS 210, one or more power control parameters, or some combination thereof. For example, a PRS pattern may be based on a quantity of UEs in the group, an orthogonal cover code (OCC), a cyclic shift, a comb (e.g., a frequency resource index), or the like, or any combination thereof. As an example, a PRS pattern may determine that the PRS is mapped to every N resource elements; the value of N may be preconfigured or predetermined, or may be configurable (e.g., by a UE 115) from a set of candidate values. In some cases, the PRS pattern for a PRS may differ from symbol to symbol, e.g., if the PRS is transmitted over multiple symbols.

Other PRS parameters may include, but are not limited to, a channel access procedure type (e.g., for the responder UEs), a configuration of the transmission window, a duration of the gap 220, or the like. In some cases, some or all of the PRS parameters may be preconfigured or predetermined. In other cases, the UE 115-a may determine and indicate one or more PRS parameters to the UEs 115-b, 115-c, and 115-d. For example, the UE 115-a may determine and indicate the duration of the gap 220 to the UEs 115-b, 115-c, and 115-d. Additionally, or alternatively, the UE 115-a may determine and indicate the type of channel access procedure to be performed by the UEs 115-b, 115-c, and 115-d. In some examples, the channel access procedure type may be associated with a duration of the gap 220; in such examples, the UE 115-a may determine and indicate both the channel access procedure type and the corresponding duration of the gap 220.

In some cases, the PRS parameters may be determined and indicated during formation of the group of UEs. For example, the initiator UE (e.g., the UE 115-a) may determine the PRS parameters during the group formation and may indicate the PRS parameters to the responder UEs, e.g., as part of a group configuration message. As illustrated in FIG. 2, the initiator UE may determine the frequency resource location(s) for each of the responder PRSs 210 during the group formation and may indicate the frequency resource location(s) to the respective responder UEs.

The group configuration message may also indicate the grouping to the responder UEs. In some cases, the group formation may be based on a signal quality (e.g., reference signal received power (RSRP)) measurement of each UE. For instance, the initiator UE may form the group of UEs such that each UE in the group has a similar RSRP measurement, which may enable the group of UEs to avoid interference or leakage from one another. The initiator UE may measure a signal quality of one or more signals received from at least one responder UE and may determine a group configuration based on the measured signal quality. The initiator UE may indicate the group configuration to the group of UEs by transmitting a group configuration message.

Additionally, or alternatively, the initiator UE may indicate a transmission power to one or more responder UEs based on the measured signal quality. For example, the UE 115-a may measure a signal quality of a signal from the UE 115-b and may determine a transmission power for the responder PRS 210-b. The UE 115-a may transmit an indication of the transmission power to the UE 115-b such that the UE 115-b may transmit the responder PRS 210-b in accordance with the transmission power.

The described techniques may thus provide for improved efficiency in positioning procedures by one or more UEs. As an example, multiple UEs (e.g., UE 115-b, UE 115-c, and UE 115-d) may perform RTT measurement with respect to one UE (e.g., UE 115-a). In one example, UE 115-a may be a vehicle UE, while the multiple UEs may be pedestrian UEs. As such, UE 115-a (e.g., the vehicle UE) may be the initiator UE and may perform relative positioning to determine a distance between itself and multiple pedestrians (e.g., corresponding to UEs 115-b, 115-c, and 115-d). In another example, the UE 115-a may be an anchor UE (e.g., an RSU with some known location or position), whereas the multiple UEs may be vehicle and/or pedestrian UEs performing RTT measurement with respect to the anchor UE. Here, the multiple UEs (e.g., UE 115-b, UE 115-c, and UE 115-d) may perform positioning procedures for their own relative or absolute positioning purposes.

In other cases, TDoA measurements may be used to position a target UE. For instance, there may be multiple anchors in a target UEs vicinity (where an anchor may correspond to a UE with a known location, such as an RSU or another device). In such examples, the target UE may be the initiator UE and transmit the initiator PRS. The anchors may be responder UEs and may each transmit the responder PRS in the same time resource. As such, the target UE may measure the responder PRSs (e.g., TDoA) for one or more positioning procedures at the target UE. In any case, the described techniques may enable robust positioning procedures by eliminating or reducing the use of multiple, sequential channel access procedures by multiple UEs, while increasing efficiency and reliability of PRS transmission for accurate positioning.

Figure 3:
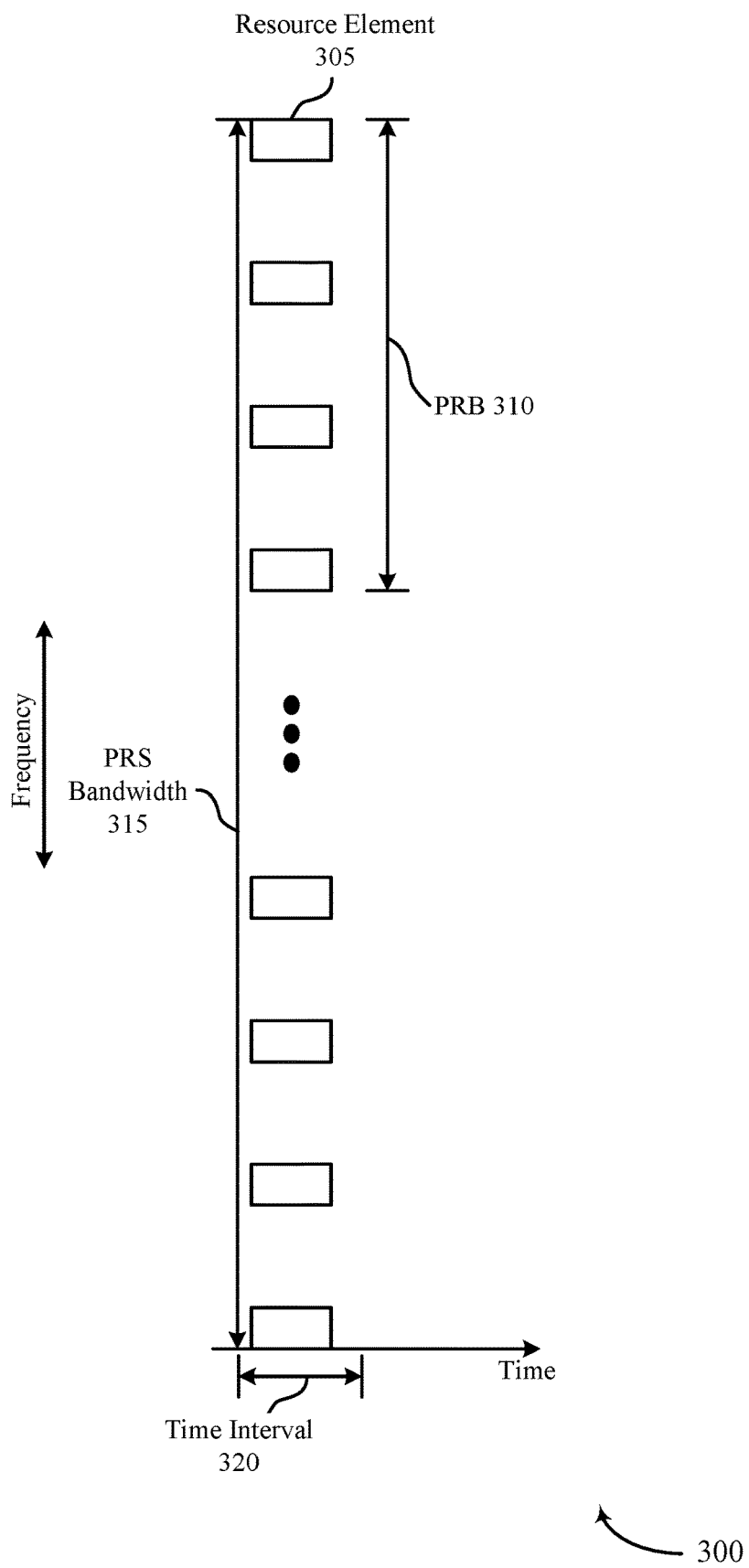
FIGS. 3 and 4 illustrate examples of transmission schemes that support channel access techniques for PRS transmission in accordance with aspects of the present disclosure.

FIG. 3 shows a transmission scheme 300 that supports channel access techniques for PRS transmission in accordance with aspects of the present disclosure. The transmission scheme 300 may implemented by a wireless communications system as described with reference to FIG. 1 or 2. For example, the transmission scheme 300 may be an example of a PRS pattern for an initiator PRS. That is, an initiator UE, after successfully performing a channel access procedure, may transmit an initiator PRS (e.g., via a sidelink channel to one or more responder UEs in a group) in accordance with the PRS pattern illustrated by transmission scheme 300.

The initiator UE may transmit the initiator PRS in one or more resource elements 305 of a physical resource block (PRB) 310 within a PRS bandwidth 315. In some examples, the PRS bandwidth 310 may be part of an unlicensed frequency spectrum. The initiator PRS may be transmitted within a time interval 320, which may be an example of a first time interval of at transmission window as described with reference to FIG. 2. In some examples, the time interval 320 may be a single slot.

The PRS pattern may be determined by the initiator UE, or may be preconfigured or predetermined. The PRS pattern may be a frequency pattern that is based on a value (e.g., N) that corresponds to a quantity of resource elements 305 within the time interval 320. For example, the PRS pattern may be comb N, where the initiator PRS is mapped to every N resource elements 305. In the example of FIG. 3, the PRS pattern is comb 4, such that the initiator PRS is mapped to every four resource elements 305 within a PRB 310. As another example, the initiator PRS may be mapped to every resource element 305 within a PRB 310 (i.e., comb 1).

In some cases, the initiator UE may transmit the initiator PRS in multiple symbols of the time interval 320, and the PRS pattern may be different across the multiple symbols or may have a per-symbol frequency offset. For instance, the initiator UE may transmit, in addition to the initiator PRS, one or more repetitions of the initiator PRS in one or more symbol periods of the first time interval 320. The initiator PRS may be transmitted in accordance with a first PRS pattern, while the one or more repetitions of the initiator PRS may be transmitted in accordance with a second PRS pattern. The first PRS pattern may be different from the second PRS pattern.

In some examples, the initiator UE may indicate the PRS pattern to the one or more responder UEs. For instance, the initiator UE may indicate the PRS pattern as part of a PRS parameter indication or a group configuration message. The one or more responder UEs may receive the initiator PRS in accordance with the PRS pattern.

Figure 4:
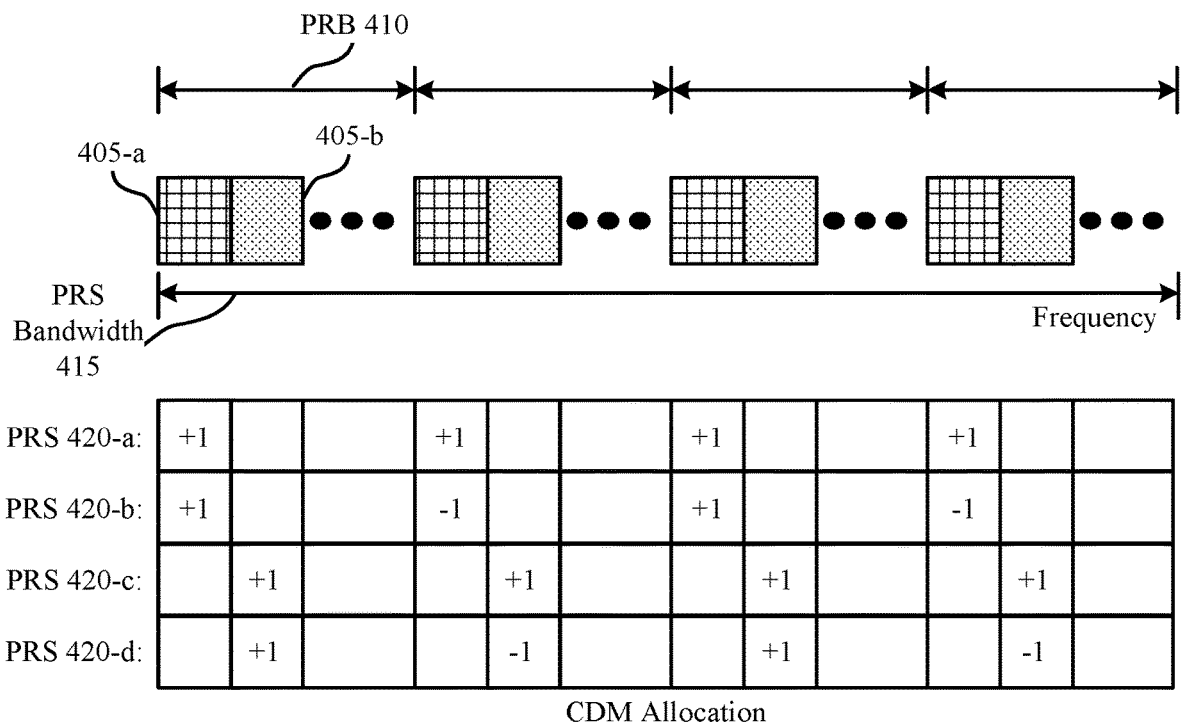

FIG. 4 shows a transmission scheme 400 that supports channel access techniques for PRS transmission in accordance with aspects of the present disclosure. The transmission scheme 400 may implemented by a wireless communications system as described with reference to FIG. 1 or 2. For example, the transmission scheme 400 may be an example of a PRS pattern for multiple responder PRSs 420. That is, after successfully performing channel access procedures, a first responder UE may transmit a responder PRS 420-a, a second responder UE may transmit a responder PRS 420-b, a third responder UE may transmit a responder PRS 420-c, and a fourth responder UE may transmit a responder PRS 420-d. The responder UEs may transmit the respective responder PRSs in accordance with the PRS pattern illustrated by transmission scheme 400.

The PRS pattern may dictate resource allocation and multiplexing information for the responder PRSs transmitted by the responder UEs. As illustrated in FIG. 4, the responder PRSs 420 are transmitted in resource elements 405 of a PRB 410 within a PRS bandwidth 415, which may be part of an unlicensed frequency spectrum. The responder PRSs 420 are transmitted in the resource elements 405 in an FDM manner within a same time interval (e.g., a second time interval of a transmission window, as described with reference to FIG. 2), such that the responder UEs in a same group transmit the responder PRSs 420 on respective resources. That is, the responder PRS 420-a and the responder PRS 420-b may be transmitted on the resource element 405-a, while the responder PRS 420-c and the responder PRS 420-d may be transmitted on the resource element 405-b. Thus, the responder PRSs 420-a and 420-b may be transmitted on a frequency resource (e.g., resource element 405-a) that is different than the frequency resource on which the responder PRSs 420-c and 420-d are transmitted (e.g., resource element 405-b).

The PRS pattern may be a frequency pattern that is based on a value (e.g., N) that corresponds to a quantity of resource elements 405 within the time interval. For example, the PRS pattern may be comb N, where a responder PRS is mapped to every N resource elements 405; up to 2N responder PRSs 420 may be multiplexed in a same time interval (e.g., a slot or a period of multiple symbols). As illustrated in FIG. 4, the responder PRSs 420 may be transmitted in accordance with a PRS pattern of comb 2, where the resource allocation of responder PRSs 420-a and 420-b may be offset from the resource allocation of responder PRSs 420-c and 420-d. Thus, the responder PRSs 420-a and 420-b may be transmitted in the resource element 405-a and in every second resource element after, while the responder PRSs 420-c and 420-d may be transmitted in the second resource element 405-b and in every second resource element after.

Additionally, or alternatively, the responder PRSs 420 may be transmitted using CDM, such that responder PRSs 420 transmitted in a same frequency resource (e.g., a resource element 405) may be orthogonal in code space. The CDM allocation may indicate a shift (e.g., a +1 or a −1) in the OCC or the cyclic shift of the corresponding responder PRS 420. For instance, the PRS pattern may indicate that the responder PRSs 420 are multiplexed using both FDM and CDM, where the responder PRSs 420 are assigned a comb and an OCC or cyclic shift.

The PRS pattern illustrated in FIG. 4 includes a combination of FDM and CDM. For instance, two-dimensional CDM may provide two levels of orthogonality, where the responder PRS 420-a may be transmitted with a first OCC and responder PRS 420-b may be transmitted with a second OCC (e.g., the responder PRS 420-a is shifted relative to the responder PRS 420-b). In the example of FIG. 4, the responder PRS 420-a may use an OCC that is shifted by +1 with respect to the responder PRS 420-b in every N resource elements 405. The responder PRS 420-b may use an OCC that is alternately shifted by +1 and −1 with respect to the responder PRS 420-a in every N resource elements 405. Thus, while both the responder PRS 420-a and the responder PRS 420-b may be transmitted in a same resource element 405 (e.g., starting with the resource element 405-a), they may be orthogonal in code space.

The responder PRSs 420-c and 420-d may also be orthogonal to one another in code space based on an OCC or cyclic shift. As illustrated in FIG. 4, the responder PRS 420-c may use an OCC that is shifted by +1 with respect to the responder PRS 420-d in every N resource elements 405. The responder PRS 420-d may use an OCC that is alternately shifted by +1 and −1 with respect to the responder PRS 420-c in every N resource elements 405. In this manner, the responder PRS 420-c and the responder PRS 420-d may be transmitted in a same resource element 405 (e.g., starting with the resource element 405-b) while maintaining orthogonality in code space.

In some examples, the PRS pattern may be determined and indicated to the responder UEs by an initiator UE, e.g., as described with reference to FIG. 2. For example, the initiator UE may assign a PRS resource (e.g., a frequency resource index or a comb) and, in some cases, an OCC or a cyclic shift to each responder UE during group formation. The initiator UE may transmit an indication of the PRS pattern to the responder UEs, e.g., as part of a PRS parameter indication or a group configuration message. The PRS pattern may be based on a number of UEs in the group. For instance, for four responder UEs, the PRS pattern may be comb 4. In some cases, the PRS pattern may represent a maximum number of responder PRSs 420 that can be multiplexed in a same time interval. As a first example, for FDM only, the PRS pattern may be comb 6, where a maximum of 6 responder PRSs 420 may be multiplexed in a same time interval. In a second example, the PRS pattern may combine FDM and CDM and may be comb 4 with two cyclic shifts, such that eight (e.g., 4*2=8) PRSs may be multiplexed in the time interval.

Figure 5:
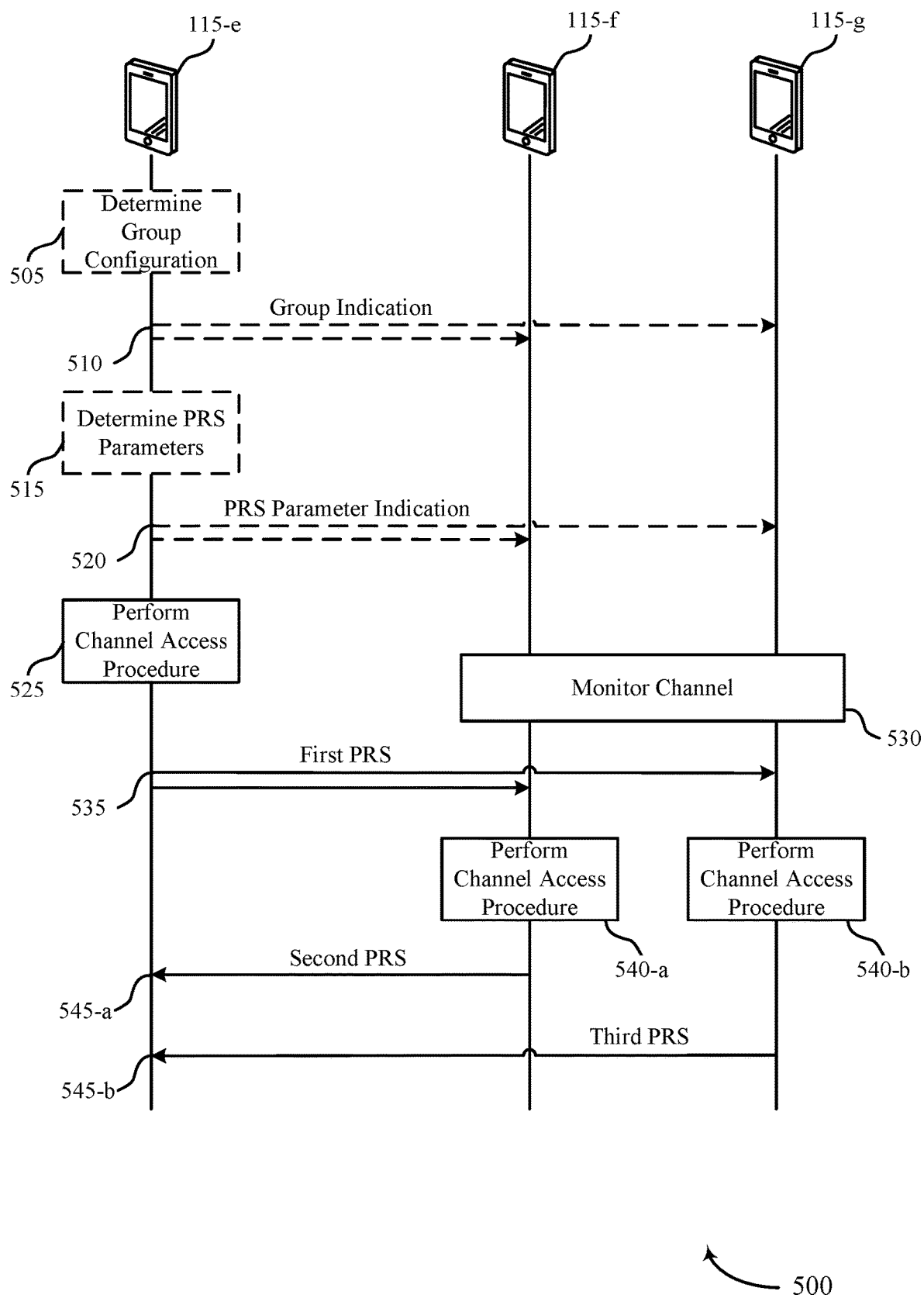
FIG. 5 illustrates an example of a process flow that supports channel access techniques for PRS transmission in accordance with aspects of the present disclosure.

FIG. 5 shows a process flow 500 that supports channel access techniques for PRS transmission in accordance with aspects of the present disclosure. The process flow 500 may implement or be implemented by aspects of the wireless communications system 100 or the wireless communications system 200. For example, the process flow 500 may be implemented by a UE 115-e, a UE 115-f, and a UE 115-g. The UE 115-e may be an example of an initiator UE, while the UEs 115-f and 115-g may be examples of responder UEs. The UEs 115 may belong to a same group and may communicate using a sidelink channel (e.g., a sidelink connection) in an unlicensed radio frequency spectrum band in accordance with the techniques described herein.

In the following description of the process flow 500, operations between the UEs 115 may be performed in a different order or at a different time than as shown. Additionally or alternatively, some operations may be omitted from the process flow 500, and other operations may be added to the process flow 500. It is to be understood that while the UEs 115 are shown performing operations of process flow 500, any wireless device may perform the operations shown.

At 505, the UE 115-e may optionally determine a group configuration for the group of UEs 115. For example, the group configuration may include one or more PRS parameters, such as a configuration of a transmission window, a duration of a gap between time intervals of the transmission window, a channel access procedure type for the UE 115-f, a channel access procedure type for the UE 115-g, resource allocations for respective PRSs, one or more PRS patterns, one or more power control parameters, or some combination thereof.

In some examples, the group configuration may be based on a measured signal quality. For instance, the UE 115-e may measure a signal quality of one or more signals received from the UE 115-f, the UE 115-g, or both. The UE 115-e may determine the group configuration based on the measured signal quality.

At 510, the UE 115-e may transmit an indication of the group configuration (e.g., determined at 505) to the UE 115-f and the UE 115-g. The indication may be transmitted as part of a group configuration message.

At 515, the UE 115-e may optionally determine one or more PRS parameters, e.g., in addition to or instead of any PRS parameters determined at 505 (e.g., during determination of the group configuration). In some cases, the UE 115-e may determine the PRS parameters based on the group of UEs 115. The PRS parameters may include, but are not limited to, configuration of a transmission window, a duration of a gap between time intervals of the transmission window, a channel access procedure type, resource allocations for respective PRSs, one or more PRS patterns, one or more power control parameters, or some combination thereof.

In some examples, the one or more PRS patterns may be based on a quantity of UEs 115 in the group, an OCC, a cyclic shift, a comb, a value corresponding to a quantity of resource elements within a first time interval of the transmission window, or some combination thereof.

In some cases, the power control parameters may be based on a signal quality measurement. For instance, the UE 115-e may measure a signal quality of a signal from the UE 115-f (e.g., and/or the UE 115-g) and may determine a transmission power for the UE 115-f to use in transmitting a PRS based on the signal quality. The power control parameters may include an indication of the transmission power.

At 520, the UE 115-e may transmit an indication of the one or more PRS parameters (e.g., determined at 515) to the UE 115-f and the UE 115-g. In some examples, the indication may be a group configuration message.

At 525, the UE 115-e may perform a channel access procedure (e.g., an LBT, such as a CAT4 LBT) during a transmission window (e.g., as determined at 505 or 515) to determine if the sidelink channel is clear.

At 530, the UEs 115-f and 115-g may monitor the sidelink channel for a first PRS (e.g., an initiator PRS) from the UE 115-e.

At 535, based on successfully performing the channel access procedure at 525, the UE 115-e may transmit the first PRS to the UE 115-f and the UE 115-g via the sidelink channel during a first interval of the transmission window. The UE 115-e may transmit the first PRS in accordance with the one or more PRS parameters (e.g., as determined at 505 and/or 515). In some examples, the UE 115-e may transmit, and the UE 115-f and the UE 115-g may receive, the first PRS in accordance with the one or more PRS patterns (e.g., as indicated at 510 and/or 520). For example, the UE 115-e may transmit the first PRS in accordance with a pattern that is based on a value corresponding to a quantity of resource elements within the first time interval of the transmission window (e.g., as described with reference to FIG. 3). In some cases, the UE 115-e may transmit, and the UE 115-f and the UE 115-g may receive, one or more repetitions of the first PRS, for instance, in one or more time symbol periods of the first time interval. In such cases, the UE 115-e may transmit the first PRS in accordance with a first PRS pattern (e.g., of the one or more PRS patterns) and the one or more repetitions of the first PRS in accordance with a second PRS pattern (e.g., of the one or more PRS patterns). In some examples, the first PRS pattern may be different from the second PRS pattern.

At 540-a and 540-b, the UE 115-f and the UE 115-g, respectively, may each perform a channel access procedure (e.g., an LBT) prior to a second time interval of the transmission window (e.g., during a gap between the first time interval and the second time interval of the transmission window). The UE 115-f and the UE 115-g may perform the respective channel access procedures based on receiving (e.g., detecting) the first PRS during the first time interval of the transmission window and in accordance with the one or more PRS parameters (e.g., as determined and indicated by the UE 115-e). In some cases, the channel access procedures may be CAT1 or CAT2 LBTs. The UE 115-e may determine and transmit an indication of the type of channel access procedure to be performed by the UE 115-*f* and the UE 115-*g*, for instance, as part of a group configuration message (e.g., indicated at 510) or a PRS parameter indication (e.g., indicated at 520). In other examples, the channel access procedure type may be preconfigured or predetermined.

In some examples, the gap may have a time duration that satisfies a threshold value (e.g., 16 µs, 25 µs). In some cases, the time duration of the gap may be predetermined or preconfigured, or may be based on the channel access type, or both. For instance, a CAT1 LBT may be associated with a gap duration of 16 µs and a CAT2 LBT may be associated with a gap duration of 25 µs. The UE 115-*f* and the UE 115-*g* may determine the time duration of the gap after receiving the first PRS, e.g., based on the channel access procedure type to be performed. In other cases, the time duration of the gap may be determined and indicated by the UE 115-*e*. For instance, the time duration of the gap may be indicated in a group configuration message (e.g., transmitted by the UE 115-*e* at 510 and/or 520) or a PRS parameter indication message (e.g., transmitted by the UE 115-*e* at 520).

At 545-*a*, the UE 115-*f* may transmit, and the UE 115-*e* may receive, a second PRS (e.g., a responder PRS) via the sidelink channel, during the second interval of the transmission window and in accordance with the one or more PRS parameters (e.g., as determined and indicated by the UE 115-*e*). For example, the UE 115-*f* may transmit the second PRS in accordance with one of the one or more PRS patterns. In some cases, the UE 115-*f* may receive, from the UE 115-*e*, an indication of a transmission power, such that the UE 115-*f* transmits the second PRS in accordance with the indicated transmission power.

At 545-*b*, the UE 115-*g* may transmit, and the UE 115-*e* may receive, a third PRS (e.g., a responder PRS) via the sidelink channel, during the second interval of the transmission window and in accordance with the one or more PRS parameters (e.g., as determined and indicated by the UE 115-*e*). For example, the UE 115-*g* may transmit the third PRS in accordance with one of the one or more PRS patterns. In some cases, the UE 115-*g* may receive, from the UE 115-*e*, an indication of a transmission power, such that the UE 115-*g* transmits the second PRS in accordance with the indicated transmission power.

The second and third PRSs transmitted at 545-*a* and 545-*b* may be multiplexed with one another within the second time interval (e.g., as described with reference to FIG. 4). For example, the second and third PRSs may be multiplexed in the frequency domain (e.g., using FDM), or may be multiplexed using CDM, or some combination thereof.

Figure 6:
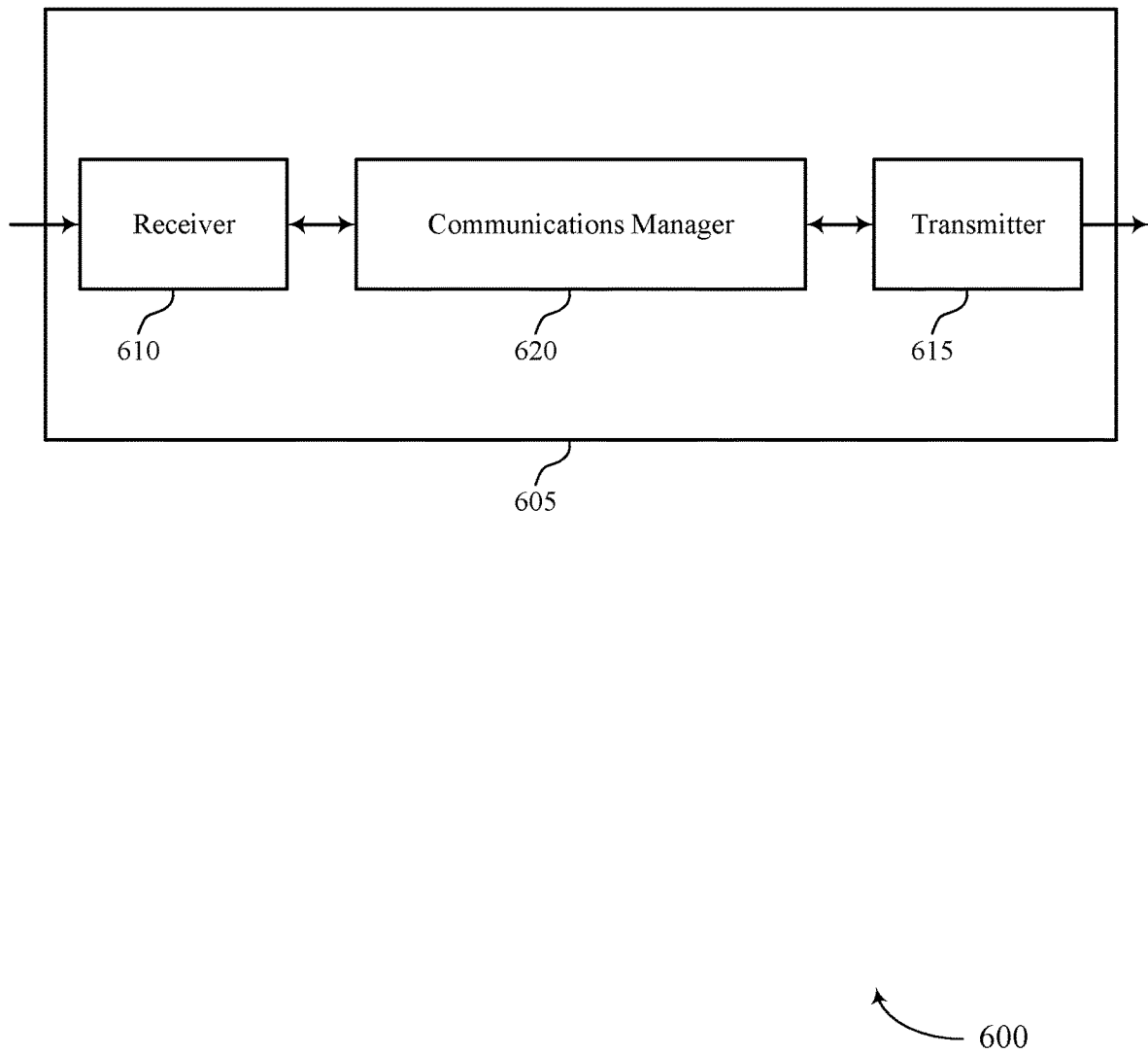
FIGS. 6 and 7 show block diagrams of devices that support channel access techniques for PRS transmission in accordance with aspects of the present disclosure.

FIG. 6 shows a block diagram 600 of a device 605 that supports channel access techniques for PRS transmission in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel access techniques for positioning reference signal transmission). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel access techniques for positioning reference signal transmission). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of channel access techniques for positioning reference signal transmission as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. For example, the communications manager 620 may be configured as or otherwise support a means for performing a channel access procedure for transmitting one or more PRSs to a group of UEs during a transmission window, where the group of UEs includes at least the first UE, a second UE, and a third UE. The communications manager 620 may be configured as or otherwise support a means for transmitting, over a sidelink communication link during a first interval of the transmission window, a first PRS to at least the second UE and the third UE based on the channel access procedure being successful. The communications manager 620 may be configured as or otherwise support a means for receiving, over the sidelink communication link during a second time interval of the transmission window, a second PRS associated with the second UE and a third PRS associated with the third UE, where the second PRS is multiplexed with the third PRS within the second time interval.

Additionally or alternatively, the communications manager 620 may support wireless communications at a first UE in accordance with examples as disclosed herein. For example, the communications manager 620 may be configured as or otherwise support a means for monitoring a sidelink channel for a first PRS from a second UE, where the first UE and the second UE belong to a same group of UEs. The communications manager 620 may be configured as or otherwise support a means for performing a channel access procedure based on receiving the first PRS during a first interval of a transmission window, where the channel access procedure is performed prior to a second time interval of the transmission window. The communications manager 620 may be configured as or otherwise support a means for transmitting, during the second time interval and based on the channel access procedure being successful, a second PRS to the second UE, where the second PRS is multiplexed with one or more other PRS transmissions from one or more other UEs within the second time interval.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient exchanges of PRSs in a sidelink communication system. For example, the device 605 may be an example of a responder UE, and may share a transmission window (i.e., a COT) with an initiator UE; thus, the device 605 may perform a relatively shorter channel access procedure based on the shared transmission window, which may reduce power consumption at the device 605. Additionally, by transmitting a responder PRS using FDM or CDM, the device 605 may reduce the duration of a PRS exchange with other devices (e.g., other sidelink UEs). The device 605 may therefore perform a sidelink positioning procedure with increased accuracy and efficiency.

Figure 7:
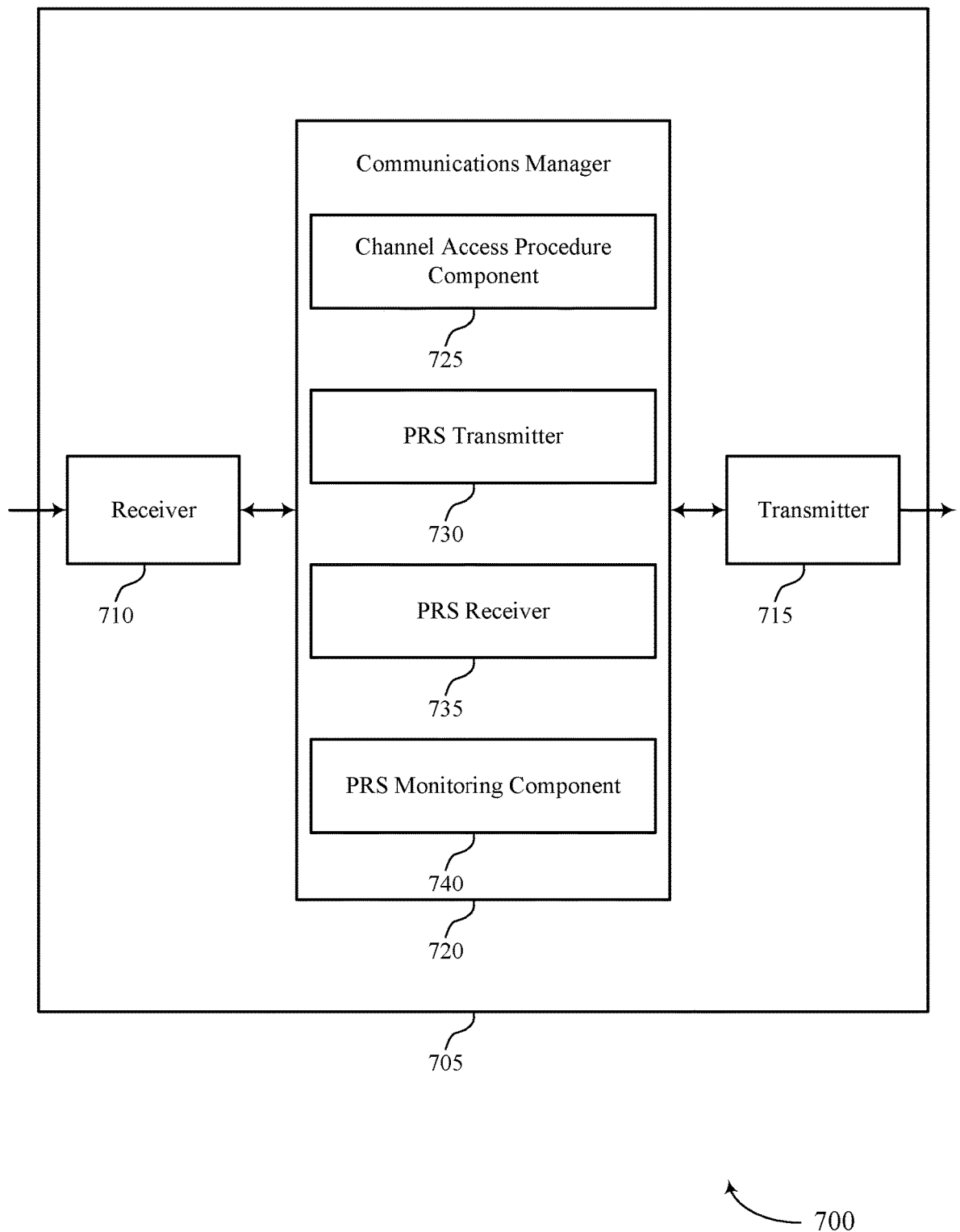

FIG. 7 shows a block diagram 700 of a device 705 that supports channel access techniques for PRS transmission in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to channel access techniques for PRS transmission). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to channel access techniques for PRS transmission). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of channel access techniques for PRS transmission as described herein. For example, the communications manager 720 may include a channel access procedure component 725, a PRS transmitter 730, a PRS receiver 735, a PRS monitoring component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. The channel access procedure component 725 may be configured as or otherwise support a means for performing a channel access procedure for transmitting one or more PRSs to a group of UEs during a transmission window, where the group of UEs includes at least the first UE, a second UE, and a third UE. The PRS transmitter 730 may be configured as or otherwise support a means for transmitting, over a sidelink communication link during a first interval of the transmission window, a first PRS to at least the second UE and the third UE based on the channel access procedure being successful. The PRS receiver 735 may be configured as or otherwise support a means for receiving, over the sidelink communication link during a second time interval of the transmission window, a second PRS associated with the second UE and a third PRS associated with the third UE, where the second PRS is multiplexed with the third PRS within the second time interval.

Additionally or alternatively, the communications manager 720 may support wireless communications at a first UE in accordance with examples as disclosed herein. The PRS monitoring component 740 may be configured as or otherwise support a means for monitoring a sidelink channel for a first PRS from a second UE, where the first UE and the second UE belong to a same group of UEs. The channel access procedure component 725 may be configured as or otherwise support a means for performing a channel access procedure based on receiving the first PRS during a first interval of a transmission window, where the channel access procedure is performed prior to a second time interval of the transmission window. The PRS transmitter 730 may be configured as or otherwise support a means for transmitting, during the second time interval and based on the channel access procedure being successful, a second PRS to the second UE, where the second PRS is multiplexed with one or more other PRS transmissions from one or more other UEs within the second time interval.

Figure 8:
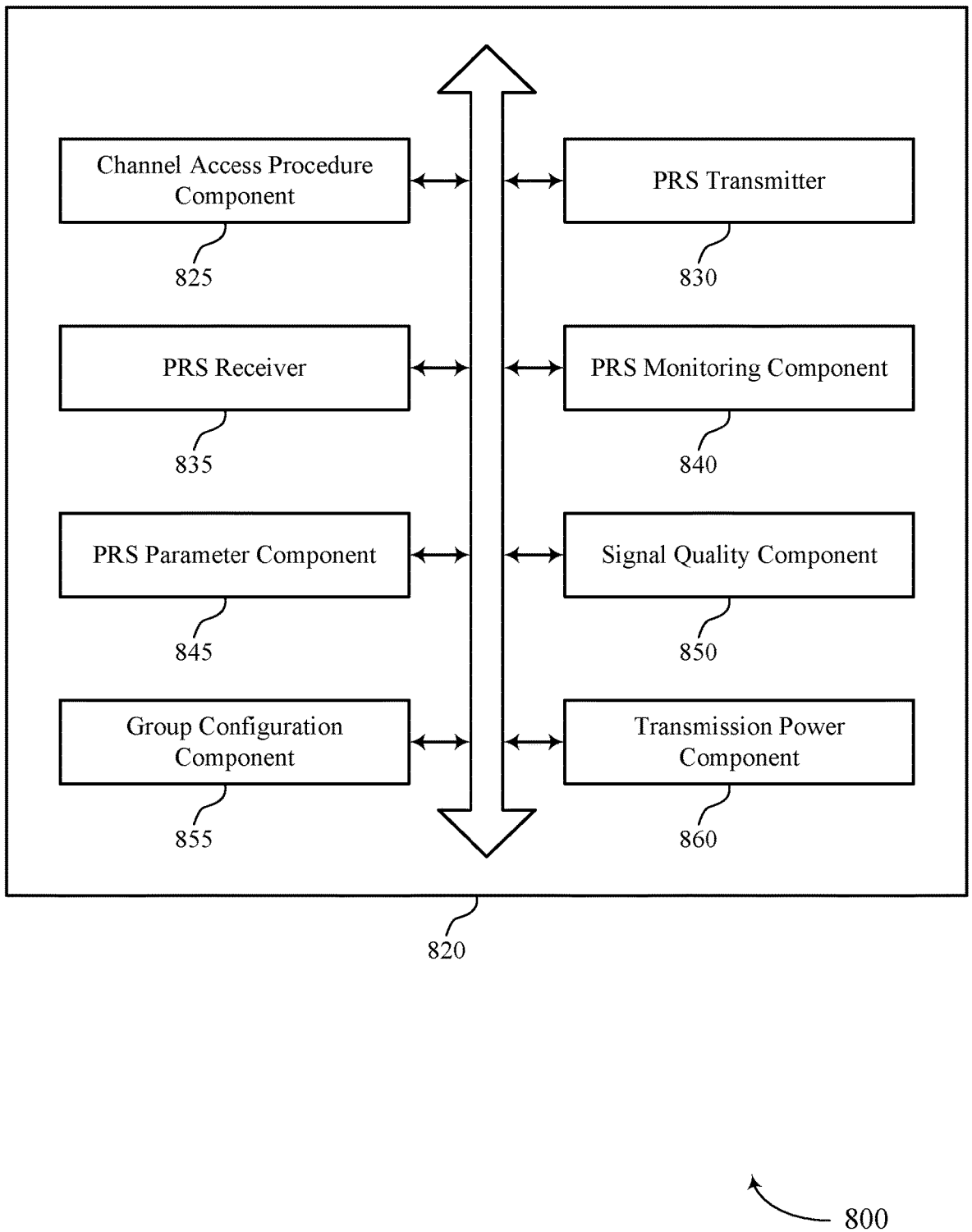
FIG. 8 shows a block diagram of a communications manager that supports channel access techniques for PRS transmission in accordance with aspects of the present disclosure.

FIG. 8 shows a block diagram 800 of a communications manager 820 that supports channel access techniques for PRS transmission in accordance with aspects of the present disclosure. The communications manager 820 may be an example of aspects of a communications manager 620, a communications manager 720, or both, as described herein. The communications manager 820, or various components thereof, may be an example of means for performing various aspects of channel access techniques for PRS transmission as described herein. For example, the communications manager 820 may include a channel access procedure component 825, a PRS transmitter 830, a PRS receiver 835, a PRS monitoring component 840, a PRS parameter component 845, a signal quality component 850, a group configuration component 855, a transmission power component 860, or any combination thereof. Each of these components may communicate, directly or indirectly, with one another (e.g., via one or more buses).

The communications manager 820 may support wireless communications at a first UE in accordance with examples as disclosed herein. The channel access procedure component 825 may be configured as or otherwise support a means for performing a channel access procedure for transmitting one or more PRSs to a group of UEs during a transmission window, where the group of UEs includes at least the first UE, a second UE, and a third UE. The PRS transmitter 830 may be configured as or otherwise support a means for transmitting, over a sidelink communication link during a first interval of the transmission window, a first PRS to at least the second UE and the third UE based on the channel access procedure being successful. The PRS receiver 835 may be configured as or otherwise support a means for receiving, over the sidelink communication link during a second time interval of the transmission window, a second PRS associated with the second UE and a third PRS associated with the third UE, where the second PRS is multiplexed with the third PRS within the second time interval.

In some examples, to support transmitting the first PRS, the PRS transmitter 830 may be configured as or otherwise support a means for transmitting the first PRS in accordance with a PRS pattern, the PRS pattern being based on a value corresponding to a quantity of resource elements within the first time interval.

In some examples, to support transmitting the first PRS, the PRS transmitter 830 may be configured as or otherwise support a means for transmitting one or more repetitions of the first PRS in one or more symbol periods of the first time interval, where the first PRS is transmitted in accordance with a first PRS pattern and the one or more repetitions of the first PRS are transmitted in accordance with a second PRS pattern different from the first PRS pattern.

In some examples, the PRS parameter component 845 may be configured as or otherwise support a means for determining one or more PRS parameters based on the group of UEs, where transmitting the first PRS and receiving the second PRS and the third PRS is based on the one or more PRS parameters. In some examples, the PRS parameter component 845 may be configured as or otherwise support a means for transmitting, to the group of UEs, a message indicating the one or more PRS parameters. In some examples, the message indicating the one or more PRS parameters includes a group configuration message.

In some examples, the one or more PRS parameters include a configuration of the transmission window, a duration of a gap duration between the first time interval and the second time interval, a channel access procedure type for the second UE, a channel access procedure type for the third UE, a resource allocation for the second PRS, a resource allocation for the third PRS, one or more PRS patterns, one or more power control parameters, or any combination thereof. In some examples, the one or more PRS patterns are based on a quantity of UEs in the group, an orthogonal cover code, a cyclic shift, a comb, or any combination thereof.

In some examples, the signal quality component 850 may be configured as or otherwise support a means for measuring a signal quality of one or more signals received from at least one UE of the group of UEs. In some examples, the group configuration component 855 may be configured as or otherwise support a means for determining a group configuration for the group of UEs based on the measured signal quality. In some examples, the group configuration component 855 may be configured as or otherwise support a means for transmitting, to the group of UEs, a group configuration message indicating the group configuration.

In some examples, the signal quality component 850 may be configured as or otherwise support a means for measuring a signal quality of a signal from the second UE. In some examples, the transmission power component 860 may be configured as or otherwise support a means for determining a transmission power for the second PRS based on the signal quality. In some examples, the transmission power component 860 may be configured as or otherwise support a means for transmitting an indication of the transmission power to the second UE.

In some examples, the second PRS is multiplexed with the third PRS within the second time interval using FDM, CDM, or any combination thereof.

In some examples, the first time interval is before the second time interval, the first time interval and the second time interval being separated by a gap duration that satisfies a threshold value.

Additionally or alternatively, the communications manager 820 may support wireless communications at a first UE in accordance with examples as disclosed herein. The PRS monitoring component 840 may be configured as or otherwise support a means for monitoring a sidelink channel for a first PRS from a second UE, where the first UE and the second UE belong to a same group of UEs. In some examples, the channel access procedure component 825 may be configured as or otherwise support a means for performing a channel access procedure based on receiving the first PRS during a first interval of a transmission window, where the channel access procedure is performed prior to a second time interval of the transmission window. In some examples, the PRS transmitter 830 may be configured as or otherwise support a means for transmitting, during the second time interval and based on the channel access procedure being successful, a second PRS to the second UE, where the second PRS is multiplexed with one or more other PRS transmissions from one or more other UEs within the second time interval.

In some examples, the PRS parameter component 845 may be configured as or otherwise support a means for receiving, from the second UE, a message indicating one or more PRS parameters, where receiving the first PRS and transmitting the second PRS is based on the one or more PRS parameters. In some examples, the one or more PRS parameters include a configuration of the time window, a gap duration, a channel access procedure type for the first UE, a resource allocation for the second PRS, one or more PRS patterns, one or more power control parameters, or any combination thereof. In some examples, the first PRS is received in accordance with one of the one or more PRS patterns, the one of the one or more PRS patterns being based on a value corresponding to a quantity of resource elements within the first time interval.

In some examples, to support receiving the first PRS, the PRS receiver 835 may be configured as or otherwise support a means for receiving one or more repetitions of the first PRS in one or more symbol periods of the first time interval, where the first PRS is received in accordance with a first PRS pattern and the one or more repetitions of the first PRS are received in accordance with a second PRS pattern different from the first PRS pattern. In some examples, the one or more PRS patterns are based on a quantity of UEs in the group, an orthogonal cover code, a cyclic shift, a comb, or any combination thereof. In some examples, the message indicating the one or more PRS parameters includes a group configuration message.

In some examples, the transmission power component 860 may be configured as or otherwise support a means for receiving, from the second UE, an indication of a transmission power, where the second PRS is transmitted based on the transmission power.

In some examples, the group configuration component 855 may be configured as or otherwise support a means for receiving, from the second UE, a group configuration message indicating a grouping including at least the first UE and the second UE.

In some examples, the channel access procedure component 825 may be configured as or otherwise support a means for receiving, from the second UE, an indication of a type of channel access procedure, where the channel access procedure is performed based on the indication. In some examples, to support performing the channel access procedure, the channel access procedure component 825 may be configured as or otherwise support a means for determining a type of channel access procedure, where the type of channel access procedure is preconfigured.

In some examples, the second PRS is multiplexed with the one or more other PRSs using FDM, CDM, or any combination thereof.

In some examples, the first time interval is before the second time interval, the first time interval and the second time interval being separated by a gap duration that satisfies a threshold value.

In some examples, the channel access procedure component 825 may be configured as or otherwise support a means for determining the gap duration based on receiving the first PRS, where the gap duration is preconfigured or based on the channel access procedure, or any combination thereof.

Figure 9:
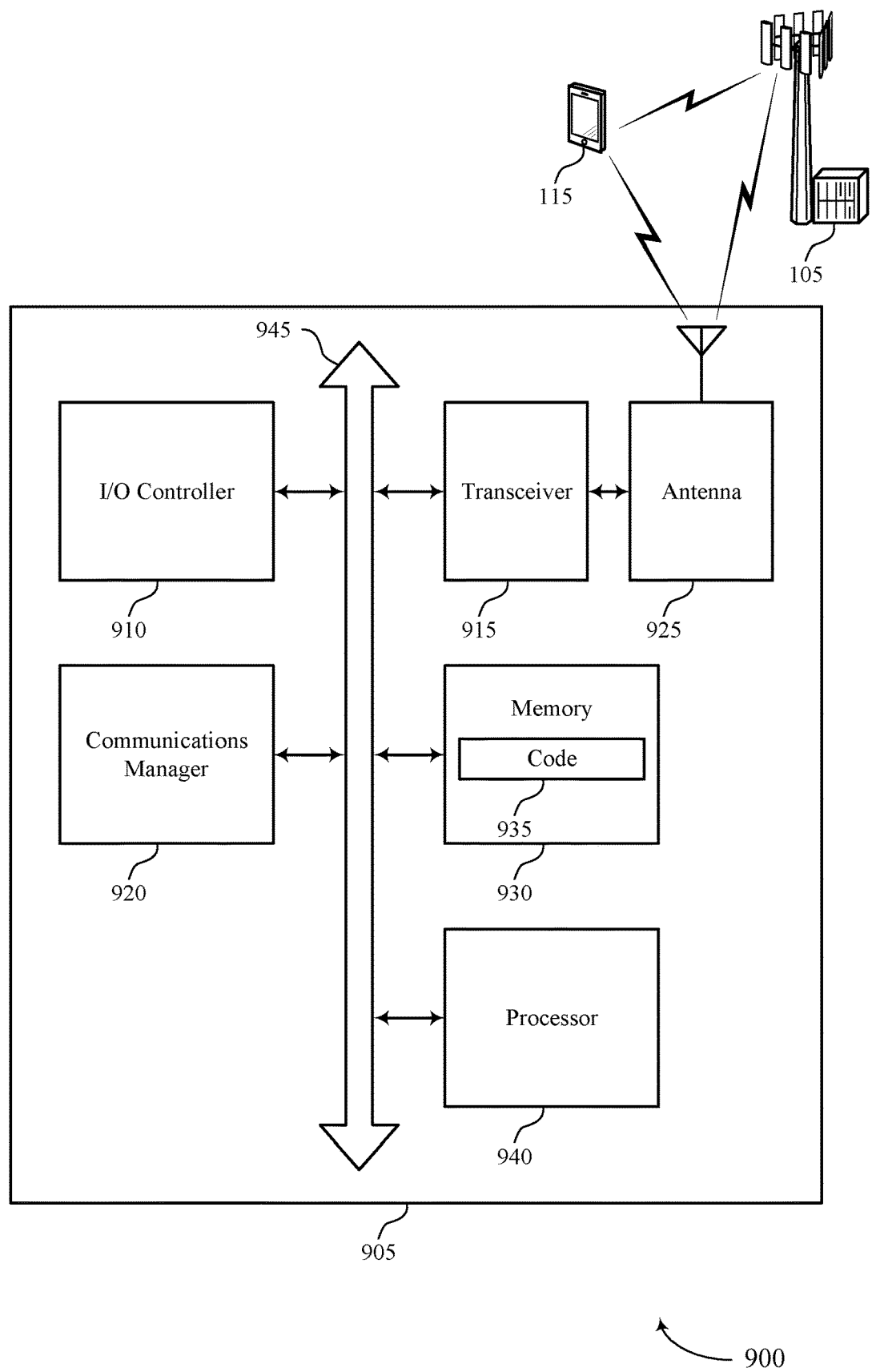
FIG. 9 shows a diagram of a system including a device that supports channel access techniques for PRS transmission in accordance with aspects of the present disclosure.

FIG. 9 shows a diagram of a system 900 including a device 905 that supports channel access techniques for PRS transmission in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting channel access techniques for PRS transmission). For example, the device 905 or a component of the device 905 may include a processor 940 and memory 930 coupled to the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for performing a channel access procedure for transmitting one or more PRSs to a group of UEs during a transmission window, where the group of UEs includes at least the first UE, a second UE, and a third UE. The communications manager 920 may be configured as or otherwise support a means for transmitting, over a sidelink communication link during a first interval of the transmission window, a first PRS to at least the second UE and the third UE based on the channel access procedure being successful. The communications manager 920 may be configured as or otherwise support a means for receiving, over the sidelink communication link during a second time interval of the transmission window, a second PRS associated with the second UE and a third PRS associated with the third UE, where the second PRS is multiplexed with the third PRS within the second time interval.

Additionally or alternatively, the communications manager 920 may support wireless communications at a first UE in accordance with examples as disclosed herein. For example, the communications manager 920 may be configured as or otherwise support a means for monitoring a sidelink channel for a first PRS from a second UE, where the first UE and the second UE belong to a same group of UEs. The communications manager 920 may be configured as or otherwise support a means for performing a channel access procedure based on receiving the first PRS during a first interval of a transmission window, where the channel access procedure is performed prior to a second time interval of the transmission window. The communications manager 920 may be configured as or otherwise support a means for transmitting, during the second time interval and based on the channel access procedure being successful, a second PRS to the second UE, where the second PRS is multiplexed with one or more other PRS transmissions from one or more other UEs within the second time interval.

By including or configuring the communications manager 920 in accordance with examples as described herein, the device 905 may support techniques for more efficient exchanges of PRSs in a sidelink communication system. For example, sharing a contention window among devices may enable the device 905 to reduce latency associated with some types of channel access procedures. Additionally, transmitting responder PRSs in an FDM and/or CDM manner may enable the device 905 and other devices to transmit the responder PRSs in a same time interval, e.g., instead of sequentially; thus, the overall duration of a PRS exchange may be reduced, which may decrease latency and improve accuracy in sidelink positioning procedures.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of channel access techniques for PRS transmission as described herein, or the processor 940 and the memory 930 may be otherwise configured to perform or support such operations.

Figure 10:
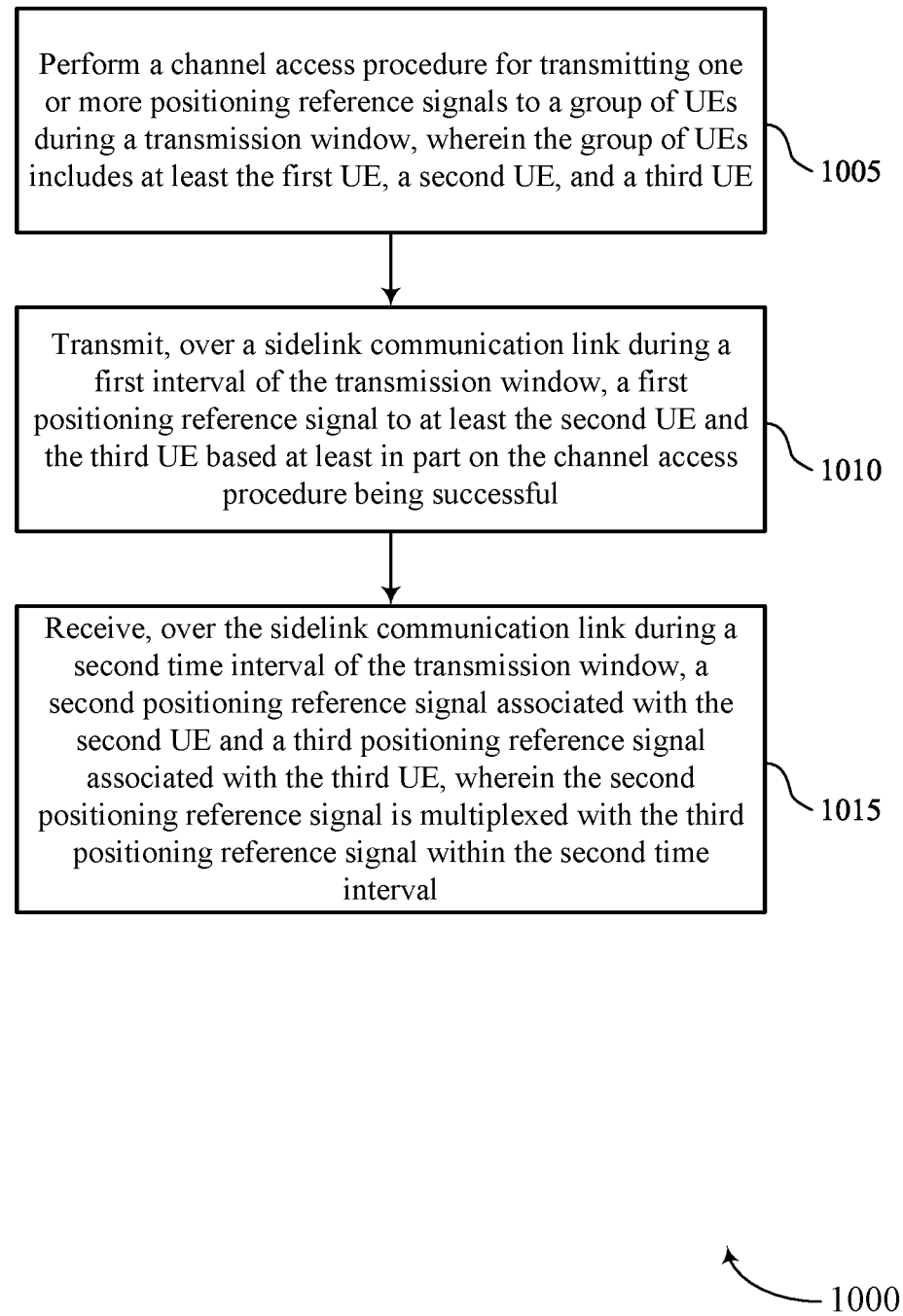
FIGS. 10 through 13 show flowcharts illustrating methods that support channel access techniques for PRS transmission in accordance with aspects of the present disclosure.

FIG. 10 shows a flowchart illustrating a method 1000 that supports channel access techniques for PRS transmission in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include performing a channel access procedure for transmitting one or more PRSs to a group of UEs during a transmission window, where the group of UEs includes at least the first UE, a second UE, and a third UE. The operations of 1005 may be performed in accordance with examples as disclosed herein. In some examples, aspects of the operations of 1005 may be performed by a channel access procedure component 825 as described with reference to FIG. 8.

At 1010, the method may include transmitting, over a sidelink communication link during a first interval of the transmission window, a first PRS to at least the second UE and the third UE based on the channel access procedure being successful. The operations of 1010 may be performed in accordance with examples as disclosed herein. In some examples, aspects of the operations of 1010 may be performed by a PRS transmitter 830 as described with reference to FIG. 8.

At 1015, the method may include receiving, over the sidelink communication link during a second time interval of the transmission window, a second PRS associated with the second UE and a third PRS associated with the third UE, where the second PRS is multiplexed with the third PRS within the second time interval. The operations of 1015 may be performed in accordance with examples as disclosed herein. In some examples, aspects of the operations of 1015 may be performed by a PRS receiver 835 as described with reference to FIG. 8.

Figure 11:
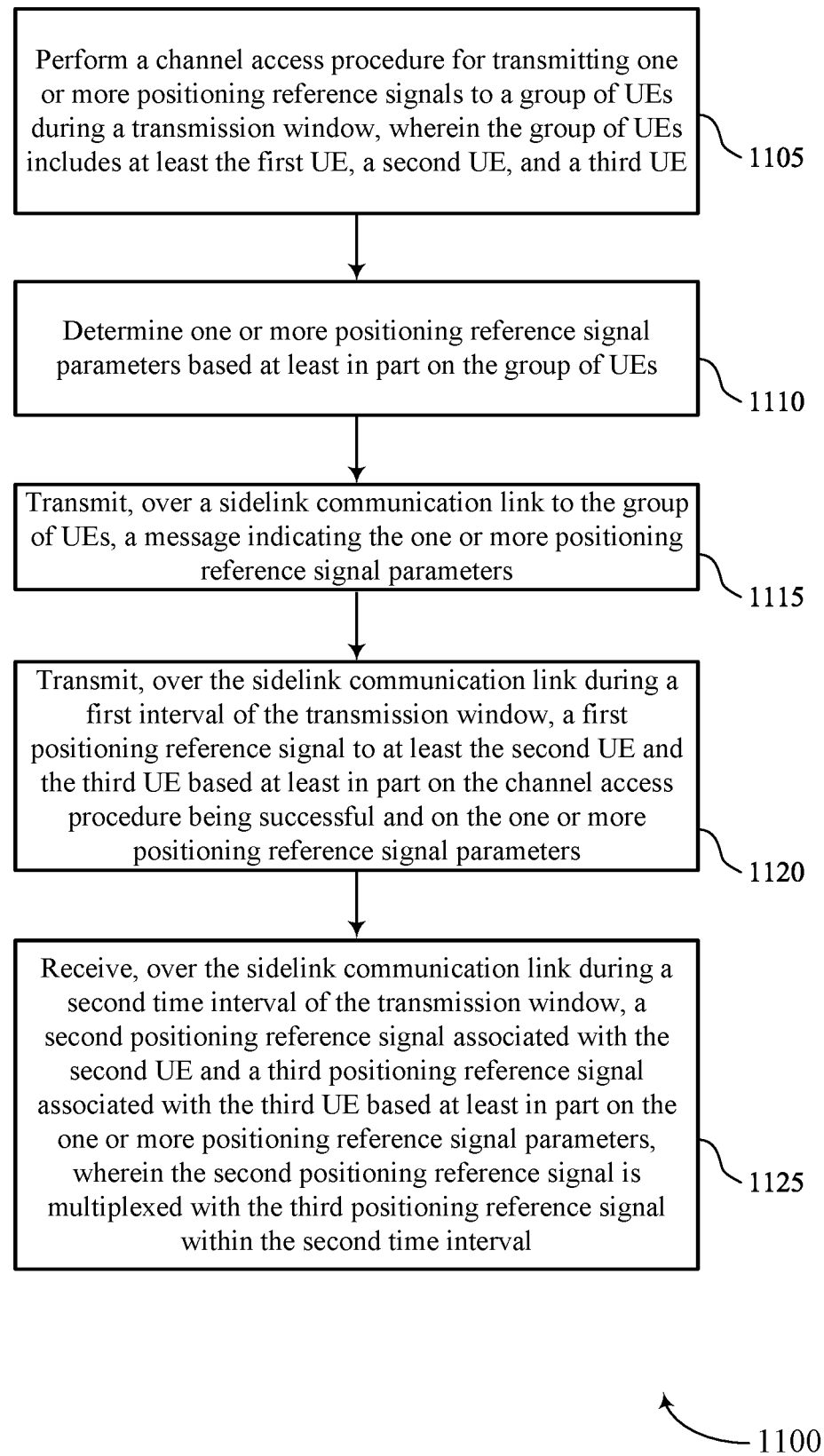

FIG. 11 shows a flowchart illustrating a method 1100 that supports channel access techniques for PRS transmission in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include performing a channel access procedure for transmitting one or more PRSs to a group of UEs during a transmission window, where the group of UEs includes at least the first UE, a second UE, and a third UE. The operations of 1105 may be performed in accordance with examples as disclosed herein. In some examples, aspects of the operations of 1105 may be performed by a channel access procedure component 825 as described with reference to FIG. 8.

At 1110, the method may include determining one or more PRS parameters based on the group of UEs. The operations of 1110 may be performed in accordance with examples as disclosed herein. In some examples, aspects of the operations of 1110 may be performed by a PRS parameter component 845 as described with reference to FIG. 8.

At 1115, the method may include transmitting, to the group of UEs, a message indicating the one or more PRS parameters. The operations of 1115 may be performed in accordance with examples as disclosed herein. In some examples, aspects of the operations of 1115 may be performed by a PRS parameter component 845 as described with reference to FIG. 8.

At 1120, the method may include transmitting, over the sidelink communication link during a first interval of the transmission window, a first PRS to at least the second UE and the third UE based on the channel access procedure being successful and on the one or more PRS parameters. The operations of 1120 may be performed in accordance with examples as disclosed herein. In some examples, aspects of the operations of 1120 may be performed by a PRS transmitter 830 as described with reference to FIG. 8.

At 1125, the method may include receiving, over the sidelink communication link during a second time interval of the transmission window, a second PRS associated with the second UE and a third PRS associated with the third UE based on the one or more PRS parameters, where the second PRS is multiplexed with the third PRS within the second time interval. The operations of 1125 may be performed in accordance with examples as disclosed herein. In some examples, aspects of the operations of 1125 may be performed by a PRS receiver 835 as described with reference to FIG. 8.

Figure 12:
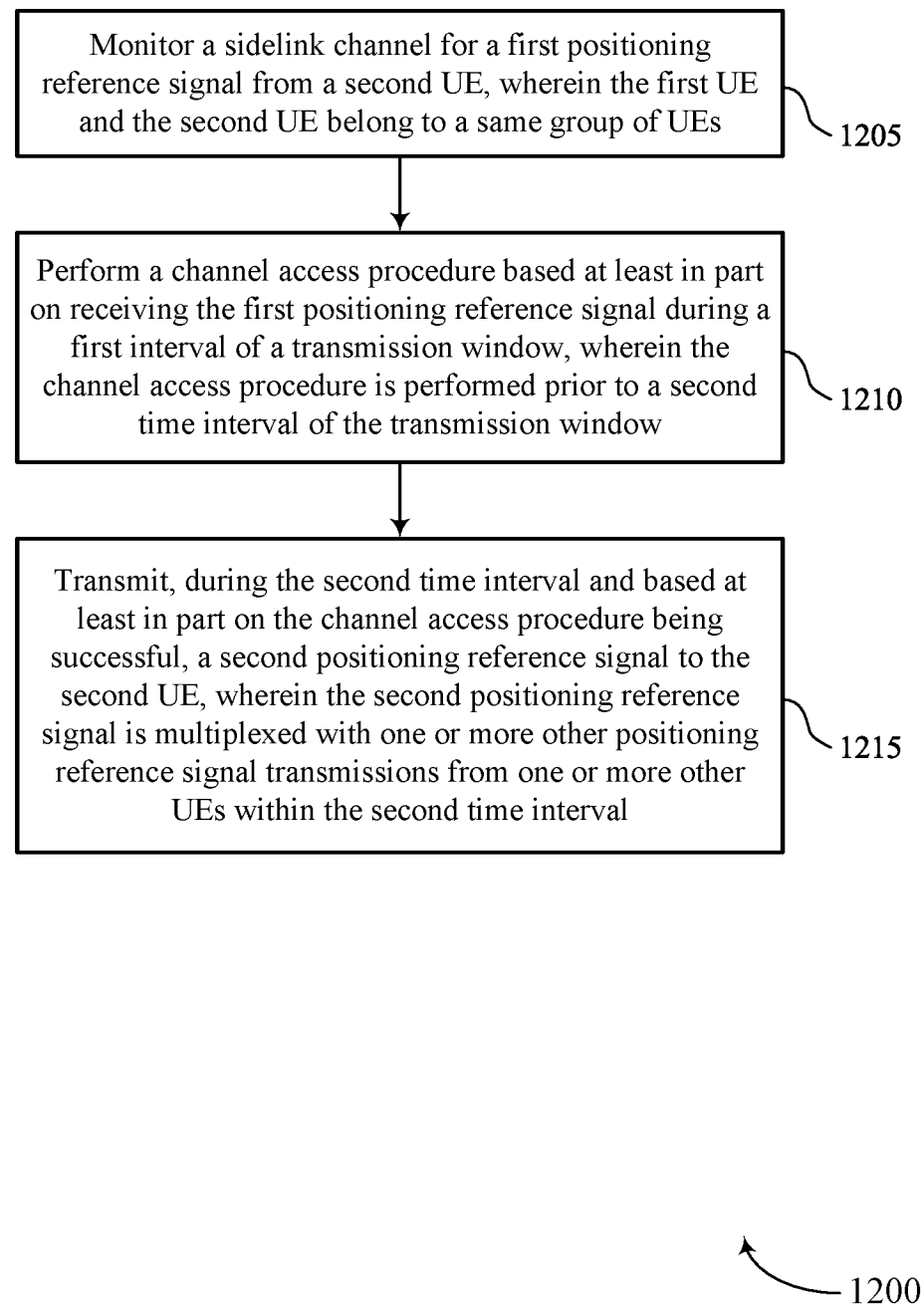

FIG. 12 shows a flowchart illustrating a method 1200 that supports channel access techniques for PRS transmission in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include monitoring a sidelink channel for a first PRS from a second UE, where the first UE and the second UE belong to a same group of UEs. The operations of 1205 may be performed in accordance with examples as disclosed herein. In some examples, aspects of the operations of 1205 may be performed by a PRS monitoring component 840 as described with reference to FIG. 8.

At 1210, the method may include performing a channel access procedure based on receiving the first PRS during a first interval of a transmission window, where the channel access procedure is performed prior to a second time interval of the transmission window. The operations of 1210 may be performed in accordance with examples as disclosed herein. In some examples, aspects of the operations of 1210 may be performed by a channel access procedure component 825 as described with reference to FIG. 8.

At 1215, the method may include transmitting, during the second time interval and based on the channel access procedure being successful, a second PRS to the second UE, where the second PRS is multiplexed with one or more other PRS transmissions from one or more other UEs within the second time interval. The operations of 1215 may be performed in accordance with examples as disclosed herein. In some examples, aspects of the operations of 1215 may be performed by a PRS transmitter 830 as described with reference to FIG. 8.

Figure 13:
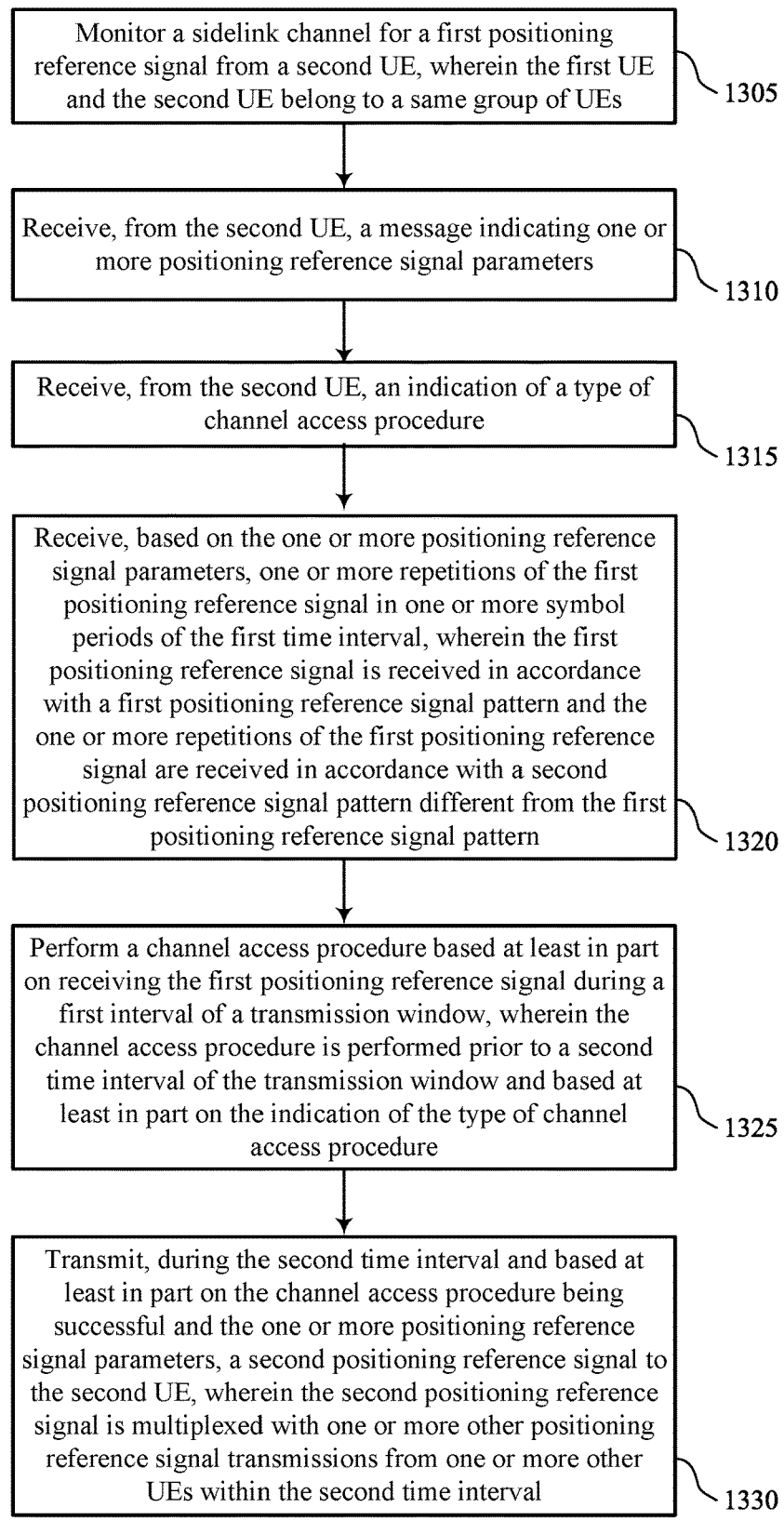

FIG. 13 shows a flowchart illustrating a method 1300 that supports channel access techniques for PRS transmission in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include monitoring a sidelink channel for a first PRS from a second UE, where the first UE and the second UE belong to a same group of UEs. The operations of 1305 may be performed in accordance with examples as disclosed herein. In some examples, aspects of the operations of 1305 may be performed by a PRS monitoring component 840 as described with reference to FIG. 8.

At 1310, the method may include receiving, from the second UE, a message indicating one or more PRS parameters. The operations of 1310 may be performed in accordance with examples as disclosed herein. In some examples, aspects of the operations of 1310 may be performed by a PRS parameter component 845 as described with reference to FIG. 8.

At 1315, the method may include receiving, from the second UE, an indication of a type of channel access procedure, where the channel access procedure is performed based on the indication. The operations of 1315 may be performed in accordance with examples as disclosed herein. In some examples, aspects of the operations of 1315 may be performed by a channel access procedure component 825 as described with reference to FIG. 8.

At 1320, the method may include receiving, based on the one or more PRS parameters, one or more repetitions of the first PRS in one or more symbol periods of the first time interval, where the first PRS is received in accordance with a first PRS pattern and the one or more repetitions of the first PRS are received in accordance with a second PRS pattern different from the first PRS pattern. The operations of 1320 may be performed in accordance with examples as disclosed herein. In some examples, aspects of the operations of 1320 may be performed by a PRS receiver 835 as described with reference to FIG. 8.

At 1325, the method may include performing a channel access procedure based on receiving the first PRS during a first interval of a transmission window, where the channel access procedure is performed prior to a second time interval of the transmission window. The operations of 1325 may be performed in accordance with examples as disclosed herein. In some examples, aspects of the operations of 1325 may be performed by a channel access procedure component 825 as described with reference to FIG. 8.

At 1330, the method may include transmitting, during the second time interval and based on the channel access procedure being successful and the one or more PRS parameters, a second PRS to the second UE, where the second PRS is multiplexed with one or more other PRS transmissions from one or more other UEs within the second time interval. The operations of 1330 may be performed in accordance with examples as disclosed herein. In some examples, aspects of the operations of 1330 may be performed by a PRS transmitter 830 as described with reference to FIG. 8.

The following provides an overview of aspects of the present disclosure:

Aspect 1: A method for wireless communications at a first UE, comprising: performing a channel access procedure for transmitting one or more PRSs to a group of UEs during a transmission window, wherein the group of UEs includes at least the first UE, a second UE, and a third UE; transmitting, over a sidelink communication link during a first interval of the transmission window, a first PRS to at least the second UE and the third UE based at least in part on the channel access procedure being successful; and receiving, over the sidelink communication link during a second time interval of the transmission window, a second PRS associated with the second UE and a third PRS associated with the third UE, wherein the second PRS is multiplexed with the third PRS within the second time interval.

Aspect 2: The method of aspect 1, wherein transmitting the first PRS comprises: transmitting the first PRS in accordance with a PRS pattern, the PRS pattern being based at least in part on a value corresponding to a quantity of resource elements within the first time interval.

Aspect 3: The method of any of aspects 1 through 2, wherein transmitting the first PRS comprises: transmitting one or more repetitions of the first PRS in one or more symbol periods of the first time interval, wherein the first PRS is transmitted in accordance with a first PRS pattern and the one or more repetitions of the first PRS are transmitted in accordance with a second PRS pattern different from the first PRS pattern.

Aspect 4: The method of any of aspects 1 through 3, further comprising: determining one or more PRS parameters based at least in part on the group of UEs, wherein transmitting the first PRS and receiving the second PRS and the third PRS is based at least in part on the one or more PRS parameters.

Aspect 5: The method of aspect 4, further comprising: transmitting, to the group of UEs, a message indicating the one or more PRS parameters.

Aspect 6: The method of aspect 5, wherein the message indicating the one or more PRS parameters comprises a group configuration message.

Aspect 7: The method of any of aspects 4 through 6, wherein the one or more PRS parameters comprise a configuration of the transmission window, a duration of a gap duration between the first time interval and the second time interval, a channel access procedure type for the second UE, a channel access procedure type for the third UE, a resource allocation for the second PRS, a resource allocation for the third PRS, one or more PRS patterns, one or more power control parameters, or any combination thereof.

Aspect 8: The method of aspect 7, wherein the one or more PRS patterns are based at least in part on a quantity of UEs in the group, an orthogonal cover code, a cyclic shift, a comb, or any combination thereof.

Aspect 9: The method of any of aspects 1 through 8, further comprising: measuring a signal quality of one or more signals received from at least one UE of the group of UEs; determining a group configuration for the group of UEs based at least in part on the measured signal quality; and transmitting, to the group of UEs, a group configuration message indicating the group configuration.

Aspect 10: The method of any of aspects 1 through 9, further comprising: measuring a signal quality of a signal from the second UE; determining a transmission power for the second PRS based at least in part on the signal quality; and transmitting an indication of the transmission power to the second UE.

Aspect 11: The method of any of aspects 1 through 10, wherein the second PRS is multiplexed with the third PRS within the second time interval using FDM, CDM, or any combination thereof.

Aspect 12: The method of any of aspects 1 through 11, wherein the first time interval is before the second time interval, the first time interval and the second time interval being separated by a gap duration that satisfies a threshold value.

Aspect 13: A method for wireless communications at a first UE, comprising: monitoring a sidelink channel for a first PRS from a second UE, wherein the first UE and the second UE belong to a same group of UEs; performing a channel access procedure based at least in part on receiving the first PRS during a first interval of a transmission window, wherein the channel access procedure is performed prior to a second time interval of the transmission window; and transmitting, during the second time interval and based at least in part on the channel access procedure being successful, a second PRS to the second UE, wherein the second PRS is multiplexed with one or more other PRS transmissions from one or more other UEs within the second time interval.

Aspect 14: The method of aspect 13, further comprising: receiving, from the second UE, a message indicating one or more PRS parameters, wherein receiving the first PRS and transmitting the second PRS is based at least in part on the one or more PRS parameters.

Aspect 15: The method of aspect 14, wherein the one or more PRS parameters comprise a configuration of the time window, a gap duration, a channel access procedure type for the first UE, a resource allocation for the second PRS, one or more PRS patterns, one or more power control parameters, or any combination thereof.

Aspect 16: The method of aspect 15, wherein the first PRS is received in accordance with one of the one or more PRS patterns, the one of the one or more PRS patterns being based at least in part on a value corresponding to a quantity of resource elements within the first time interval.

Aspect 17: The method of any of aspects 15 through 16, wherein receiving the first PRS further comprises: receiving one or more repetitions of the first PRS in one or more symbol periods of the first time interval, wherein the first PRS is received in accordance with a first PRS pattern and the one or more repetitions of the first PRS are received in accordance with a second PRS pattern different from the first PRS pattern.

Aspect 18: The method of any of aspects 15 through 17, wherein the one or more PRS patterns are based at least in part on a quantity of UEs in the group, an orthogonal cover code, a cyclic shift, a comb, or any combination thereof.

Aspect 19: The method of any of aspects 14 through 18, wherein the message indicating the one or more PRS parameters comprises a group configuration message.

Aspect 20: The method of any of aspects 13 through 19, further comprising: receiving, from the second UE, an indication of a transmission power, wherein the second PRS is transmitted based at least in part on the transmission power.

Aspect 21: The method of any of aspects 13 through 20, further comprising: receiving, from the second UE, a group configuration message indicating a grouping including at least the first UE and the second UE.

Aspect 22: The method of any of aspects 13 through 21, further comprising: receiving, from the second UE, an indication of a type of channel access procedure, wherein the channel access procedure is performed based at least in part on the indication.

Aspect 23: The method of any of aspects 13 through 22, wherein performing the channel access procedure further comprises: determining a type of channel access procedure, wherein the type of channel access procedure is preconfigured.

Aspect 24: The method of any of aspects 13 through 23, wherein the second PRS is multiplexed with the one or more other PRSs using FDM, CDM, or any combination thereof.

Aspect 25: The method of any of aspects 13 through 24, wherein the first time interval is before the second time interval, the first time interval and the second time interval being separated by a gap duration that satisfies a threshold value.

Aspect 26: The method of aspect 25, further comprising: determining the gap duration based at least in part on receiving the first PRS, wherein the gap duration is preconfigured or based at least in part on the channel access procedure.

Aspect 27: An apparatus for wireless communications at a first UE, comprising a processor; memory coupled with the processor; and instructions stored in the memory and executable by the processor to cause the apparatus to perform a method of any of aspects 1 through 12.

Aspect 28: An apparatus for wireless communications at a first UE, comprising at least one means for performing a method of any of aspects 1 through 12.

Aspect 29: A non-transitory computer-readable medium storing code for wireless communications at a first UE, the code comprising instructions executable by a processor to perform a method of any of aspects 1 through 12.

Aspect 30: An apparatus for wireless communications at a first UE, comprising a processor; memory coupled with the processor; and instructions stored in the memory and executable by the processor to cause the apparatus to perform a method of any of aspects 13 through 26.

Aspect 31: An apparatus for wireless communications at a first UE, comprising at least one means for performing a method of any of aspects 13 through 26.

Aspect 32: A non-transitory computer-readable medium storing code for wireless communications at a first UE, the code comprising instructions executable by a processor to perform a method of any of aspects 13 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
    performing a channel access procedure for transmitting one or more positioning reference signals to a group of UEs during a transmission window, wherein the group of UEs includes at least the first UE, a second UE, and a third UE;
    transmitting, over a sidelink communication link during a first interval of the transmission window, a first positioning reference signal to at least the second UE and the third UE based at least in part on the channel access procedure being successful; and
    receiving, over the sidelink communication link during a second time interval of the transmission window, a second positioning reference signal associated with the second UE and a third positioning reference signal associated with the third UE, wherein the second positioning reference signal is multiplexed with the third positioning reference signal within the second time interval.

2. The method of claim 1, wherein transmitting the first positioning reference signal comprises:
    transmitting the first positioning reference signal in accordance with a positioning reference signal pattern, the positioning reference signal pattern being based at least in part on a value corresponding to a quantity of resource elements within the first time interval.

3. The method of claim 1, wherein transmitting the first positioning reference signal comprises:
    transmitting one or more repetitions of the first positioning reference signal in one or more symbol periods of the first time interval, wherein the first positioning reference signal is transmitted in accordance with a first positioning reference signal pattern and the one or more repetitions of the first positioning reference signal are transmitted in accordance with a second positioning reference signal pattern different from the first positioning reference signal pattern.

4. The method of claim 1, further comprising:
    determining one or more positioning reference signal parameters based at least in part on the group of UEs, wherein transmitting the first positioning reference signal and receiving the second positioning reference signal and the third positioning reference signal is based at least in part on the one or more positioning reference signal parameters.

5. The method of claim 4, further comprising:
    transmitting, to the group of UEs, a message indicating the one or more positioning reference signal parameters.

6. The method of claim 5, wherein the message indicating the one or more positioning reference signal parameters comprises a group configuration message.

7. The method of claim 4, wherein the one or more positioning reference signal parameters comprise a configuration of the transmission window, a duration of a gap duration between the first time interval and the second time interval, a channel access procedure type for the second UE, a channel access procedure type for the third UE, a resource allocation for the second positioning reference signal, a resource allocation for the third positioning reference signal, one or more positioning reference signal patterns, one or more power control parameters, or any combination thereof.

8. The method of claim 7, wherein the one or more positioning reference signal patterns are based at least in part on a quantity of UEs in the group, an orthogonal cover code, a cyclic shift, a comb, or any combination thereof.

9. The method of claim 1, further comprising:
    measuring a signal quality of one or more signals received from at least one UE of the group of UEs;
    determining a group configuration for the group of UEs based at least in part on the measured signal quality; and
    transmitting, to the group of UEs, a group configuration message indicating the group configuration.

10. The method of claim 1, further comprising:
    measuring a signal quality of a signal from the second UE;
    determining a transmission power for the second positioning reference signal based at least in part on the signal quality; and
    transmitting an indication of the transmission power to the second UE.

11. The method of claim 1, wherein the second positioning reference signal is multiplexed with the third positioning reference signal within the second time interval using frequency division multiplexing, code division multiplexing, or any combination thereof.

12. The method of claim 1, wherein the first time interval is before the second time interval, the first time interval and the second time interval being separated by a gap duration that satisfies a threshold value.

13. A method for wireless communications at a first user equipment (UE), comprising:
monitoring a sidelink channel for a first positioning reference signal from a second UE, wherein the first UE and the second UE belong to a same group of UEs;
performing a channel access procedure based at least in part on receiving the first positioning reference signal during a first interval of a transmission window, wherein the channel access procedure is performed prior to a second time interval of the transmission window; and
transmitting, during the second time interval and based at least in part on the channel access procedure being successful, a second positioning reference signal to the second UE, wherein the second positioning reference signal is multiplexed with one or more other positioning reference signal transmissions from one or more other UEs within the second time interval.

14. The method of claim 13, further comprising:
receiving, from the second UE, a message indicating one or more positioning reference signal parameters, wherein receiving the first positioning reference signal and transmitting the second positioning reference signal is based at least in part on the one or more positioning reference signal parameters.

15. The method of claim 14, wherein the one or more positioning reference signal parameters comprise a configuration of the time window, a gap duration, a channel access procedure type for the first UE, a resource allocation for the second positioning reference signal, one or more positioning reference signal patterns, one or more power control parameters, or any combination thereof.

16. The method of claim 15, wherein the first positioning reference signal is received in accordance with one of the one or more positioning reference signal patterns, the one of the one or more positioning reference signal patterns being based at least in part on a value corresponding to a quantity of resource elements within the first time interval.

17. The method of claim 15, wherein receiving the first positioning reference signal further comprises:
receiving one or more repetitions of the first positioning reference signal in one or more symbol periods of the first time interval, wherein the first positioning reference signal is received in accordance with a first positioning reference signal pattern and the one or more repetitions of the first positioning reference signal are received in accordance with a second positioning reference signal pattern different from the first positioning reference signal pattern.

18. The method of claim 15, wherein the one or more positioning reference signal patterns are based at least in part on a quantity of UEs in the group, an orthogonal cover code, a cyclic shift, a comb, or any combination thereof.

19. The method of claim 14, wherein the message indicating the one or more positioning reference signal parameters comprises a group configuration message.

20. The method of claim 13, further comprising:
receiving, from the second UE, an indication of a transmission power, wherein the second positioning reference signal is transmitted based at least in part on the transmission power.

21. The method of claim 13, further comprising:
receiving, from the second UE, a group configuration message indicating a grouping including at least the first UE and the second UE.

22. The method of claim 13, further comprising:
receiving, from the second UE, an indication of a type of channel access procedure, wherein the channel access procedure is performed based at least in part on the indication.

23. The method of claim 13, wherein performing the channel access procedure further comprises:
determining a type of channel access procedure, wherein the type of channel access procedure is preconfigured.

24. The method of claim 13, wherein the second positioning reference signal is multiplexed with the one or more other positioning reference signals using frequency division multiplexing, code division multiplexing, or any combination thereof.

25. The method of claim 13, wherein the first time interval is before the second time interval, the first time interval and the second time interval being separated by a gap duration that satisfies a threshold value.

26. The method of claim 25, further comprising:
determining the gap duration based at least in part on receiving the first positioning reference signal, wherein the gap duration is preconfigured, or based at least in part on the channel access procedure, or any combination thereof.

27. An apparatus for wireless communications at a first user equipment (UE), comprising:
a processor;
memory coupled with the processor; and
instructions stored in the memory and executable by the processor to cause the apparatus to:
perform a channel access procedure for transmitting one or more positioning reference signals to a group of UEs during a transmission window, wherein the group of UEs includes at least the first UE, a second UE, and a third UE;
transmit, over a sidelink communication link during a first interval of the transmission window, a first positioning reference signal to at least the second UE and the third UE based at least in part on the channel access procedure being successful; and
receive, over the sidelink communication link during a second time interval of the transmission window, a second positioning reference signal associated with the second UE and a third positioning reference signal associated with the third UE, wherein the second positioning reference signal is multiplexed with the third positioning reference signal within the second time interval.

28. The apparatus of claim 27, wherein the instructions to transmit the first positioning reference signal are executable by the processor to cause the apparatus to:
transmit the first positioning reference signal in accordance with a positioning reference signal pattern, the positioning reference signal pattern being based at least in part on a value corresponding to a quantity of resource elements within the first time interval.

29. An apparatus for wireless communications at a first user equipment (UE), comprising:
a processor;
memory coupled with the processor; and
instructions stored in the memory and executable by the processor to cause the apparatus to:
monitor a sidelink channel for a first positioning reference signal from a second UE, wherein the first UE and the second UE belong to a same group of UEs;
perform a channel access procedure based at least in part on receiving the first positioning reference signal during a first interval of a transmission window, wherein the channel access procedure is performed prior to a second time interval of the transmission window; and transmit, during the second time interval and based at least in part on the channel access procedure being successful, a second positioning reference signal to the second UE, wherein the second positioning reference signal is multiplexed with one or more other positioning reference signal transmissions from one or more other UEs within the second time interval.

30. The apparatus of claim 29, wherein the instructions are further executable by the processor to cause the apparatus to:

receive, from the second UE, a message indicating one or more positioning reference signal parameters, wherein receiving the first positioning reference signal and transmitting the second positioning reference signal is based at least in part on the one or more positioning reference signal parameters.

* * * * *